(12) United States Patent
Kim et al.

(10) Patent No.: US 7,102,634 B2
(45) Date of Patent: Sep. 5, 2006

(54) APPARATUS AND METHOD FOR DISPLAYING VIRTUAL ENDOSCOPY DISPLAY

(75) Inventors: Bo-Hyoung Kim, Busan (KR); Yeong-Gil Shin, Seoul (KR); Jin-Wook Chung, Seoul (KR)

(73) Assignee: Infinitt Co., Ltd, Seoul (KR)

( * ) Notice: Subject to any disclaimer, the term of this patent is extended or adjusted under 35 U.S.C. 154(b) by 0 days.

(21) Appl. No.: 10/471,228

(22) PCT Filed: Nov. 11, 2002

(86) PCT No.: PCT/KR02/02105

§ 371 (c)(1),
(2), (4) Date: Sep. 23, 2004

(87) PCT Pub. No.: WO03/057017

PCT Pub. Date: Jul. 17, 2003

(65) Prior Publication Data
US 2005/0024724 A1 Feb. 3, 2005

(30) Foreign Application Priority Data
Jan. 9, 2002 (KR) ...................... 10-2002-0001214

(51) Int. Cl.
*G06T 15/00* (2006.01)
*G06T 15/20* (2006.01)
*G09G 5/00* (2006.01)
*G06K 9/00* (2006.01)

(52) U.S. Cl. ...................... 345/419; 345/427; 345/619; 382/130; 382/131; 382/154

(58) Field of Classification Search ................ 345/419, 345/619, 427; 382/130, 131, 128, 154; 715/738
See application file for complete search history.

(56) References Cited

U.S. PATENT DOCUMENTS 5,544,283 A * 8/1996 Kaufman et al. ........... 345/424

(Continued)

FOREIGN PATENT DOCUMENTS

JP 11-128224 A 5/1999

OTHER PUBLICATIONS

Hong, L. et al., "Virtual voyage: interactive navigation in the human colon", Proceedings of the 24th Annual International Conference on Computer Graphics and Interactive Techniques, ACM Press/Addison-Wesley Publishing Co., NY, NY, 27-34.*

(Continued)

*Primary Examiner*—Ulka Chauhan
*Assistant Examiner*—Roberta Prendergast
(74) *Attorney, Agent, or Firm*—Global IP Counselors, LLP

(57) ABSTRACT

An apparatus and method for displaying a three-dimensional virtual endoscopic image are provided. In the method, information on a virtual endoscopic image is input in the form of volume data expressed as a function of three-dimensional position. A two-dimensional reference image, a three-dimensional reference image, and a virtual endoscopic image are detected from the volume data. The detected images are displayed on one screen. Virtual cameras are respectively displayed on areas, in which the two and three-dimensional reference images are respectively displayed. Here, a camera display sphere and a camera display circle are defined on the basis of a current position of each virtual camera. When information regarding to one image, among the two and three-dimensional reference images and the virtual endoscopic image on one screen, is changed by a user's operation, information regarding to the other images is changed based on the information changed by the user's operation.

8 Claims, 17 Drawing Sheets

U.S. PATENT DOCUMENTS

| | | | |
|---|---|---|---|
| 5,557,711 A * | 9/1996 | Malzbender | 345/422 |
| 5,611,025 A | 3/1997 | Lorensen et al. | |
| 5,734,384 A * | 3/1998 | Yanof et al. | 345/424 |
| 5,779,641 A | 7/1998 | Hatfield et al. | |
| 5,782,762 A * | 7/1998 | Vining | 600/407 |
| 5,920,319 A * | 7/1999 | Vining et al. | 345/420 |
| 5,971,767 A * | 10/1999 | Kaufman et al. | 434/267 |
| 6,002,738 A * | 12/1999 | Cabral et al. | 378/4 |
| 6,083,162 A | 7/2000 | Vining | |
| 6,246,784 B1 * | 6/2001 | Summers et al. | 382/128 |
| 6,272,366 B1 * | 8/2001 | Vining | 600/407 |
| 6,313,841 B1 * | 11/2001 | Ogata et al. | 345/424 |
| 6,331,116 B1 * | 12/2001 | Kaufman et al. | 434/262 |
| 6,343,936 B1 * | 2/2002 | Kaufman et al. | 434/262 |

OTHER PUBLICATIONS

Vilanova, A. et al. "VirEn: A Virtual Endoscopy System." Machine GRAPHICS & VISION, vol. 8, No. 3, 1999, pp. 469-487.*

Vilanova, A. et al., "Mastering interactive virtual Bronchioscopy on a Low—end PC", Proceedings of the Conference on Visualization '00, IEEE Visualization, IEEE Computer Society Press, Los Alamitos, CA, 461-464.*

Klein, G.J. et al., "A 3D navigational environment for specifying positron emission tomography volumes-of-interest", Nuclear Science Symposium and Medical Imaging Conference Record, IEEE, vol. 3, Oct. 21-28, 1995 pp. 1452-1455.*

Klein, G.J. et al., "A methodology for specifying PET VOIs using multimodality techniques", IEEE Transactions on Medical Imaging, vol. 16, Issue 4, Aug. 1997 pp. 405-415.*

Ware, C. and Osborne, S., "Exploration and virtual camera control in virtual three dimensional environments", Proceedings of the 1990 Symposium on interactive 3D Graphics, ACM Press, New York, NY, 175-183.*

* cited by examiner

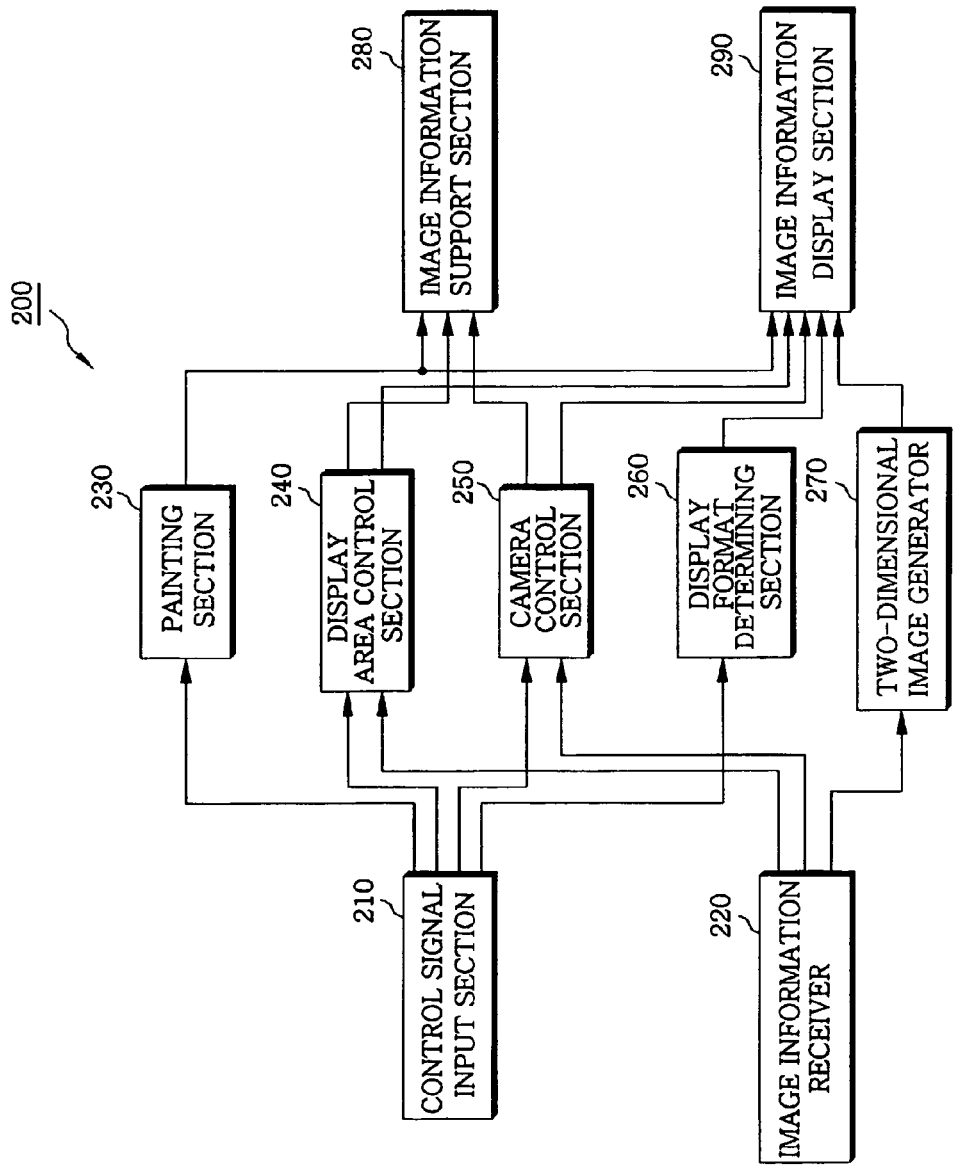

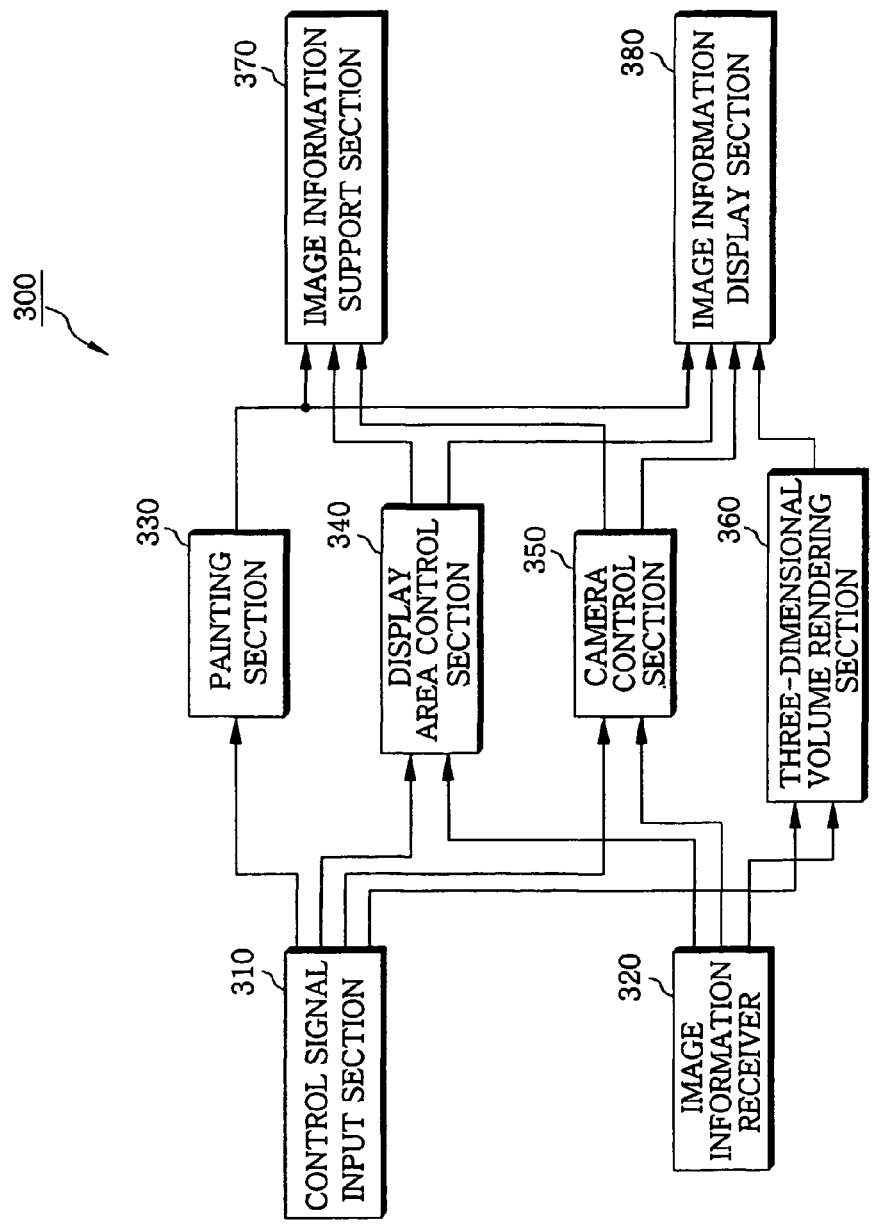

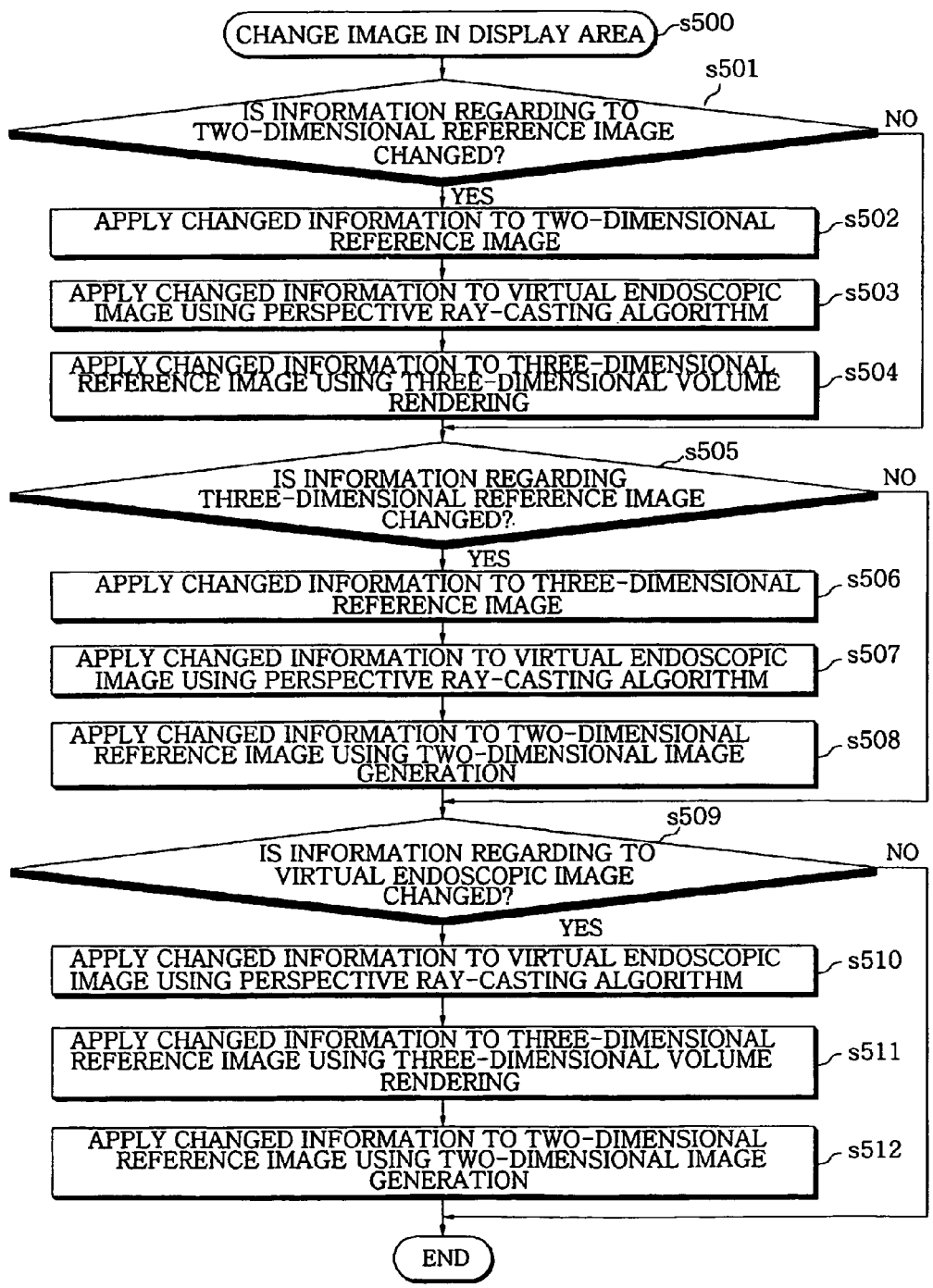

APPARATUS AND METHOD FOR DISPLAYING VIRTUAL ENDOSCOPY DISPLAY

TECHNICAL FIELD

The present invention relates to an apparatus and method for displaying a three-dimensional virtual endoscopic image, and more particularly, to an apparatus and method for displaying a three-dimensional virtual endoscopic image, through which a virtual endoscopic image is displayed along with two- and three-dimensional reference images, a virtual camera is intuitively displayed on the two- and three-dimensional reference images, and the images are controlled to be associated with one another.

Generally, three-dimensional image processing systems are applied to various fields such as design and construction of structures, for example, cars and ships, having a three-dimensional shapes and medical imaging. In particular, applying three-dimensional image processing systems to the field of medical imaging is referred to as a "three-dimensional medical imaging". Three-dimensional medical imaging is generating a three-dimensional image from a series of two-dimensional images obtained through computed tomography (CT) or magnetic resonance imaging (MRI).

While it is difficult to feel the solidity of an entire object and is impossible to observe a cross-section of the object with only a series of two-dimensional images, three-dimensional medical imaging allows the position of an affected part to be accurately estimated and a surgical operation to be predicted similarly to the real thing. Accordingly, three-dimensional medical imaging has been widely used.

BACKGROUND ART

In order to avoid giving patients discomfort provoked by an endoscope used for observing the state of the patients' internal organs, virtual endoscopy has been developed and widely and usefully used with respect to a bronchus, a blood vessel, a large intestine, a joint, and so on in a human body. In virtual endoscopy, an image similar to a real endoscopic image is generated using a series of two-dimensional images collected through CT or MRI. In other words, a virtual endoscope is noninvasive and thus allows the inside of a patient's internal organs to be observed without giving the patient pain, so recently, it is very usefully used.

A real endoscope allows the inside of internal organs to be observed only in a direction in which a camera moves. Unlikely, a virtual endoscope allows a user to observe the inside of internal organ in desired directions and is thus very helpful to diagnosis.

However, a conventional virtual endoscope is difficult to operate due to inefficient user interface.

For example, a conventional virtual endoscopic method is composed of a two-dimensional reference image acquired using an image input apparatus and a virtual endoscopic image generated from the two-dimensional reference image. Accordingly, in the conventional virtual endoscopic method, a correlation between the reference image and the virtual endoscopic image is two-dimensionally shown, so it is difficult to express a three-dimensional correlation and detect the position of a part shown in the virtual endoscopic image or a relative relation with other structures.

In the conventional virtual endoscopic method, a virtual camera is controlled and expressed in a two-dimensional reference image. Accordingly, it is difficult for a user to operate the virtual camera in a desired direction and recognize the direction of the virtual camera.

DISCLOSURE OF THE INVENTION

The present invention provides an apparatus and method for displaying a three-dimensional virtual endoscopic image, through which a virtual endoscopic image is displayed along with two- and three-dimensional reference images in order to effectively show a correlation between the reference images and the virtual endoscopic image, and a virtual camera is intuitively displayed on the two- and three-dimensional reference images in order to facilitate the operation of the virtual camera.

According to an aspect of the present invention, there is provided an apparatus for displaying a three-dimensional virtual endoscopic image. The apparatus includes a volume data input unit, which inputs information on a virtual endoscopic image in the form of volume data expressed as a function of three-dimensional position; a two-dimensional reference image display control unit, which derives a two-dimensional reference image from the volume data and displays the two-dimensional reference image; a three-dimensional reference image display control unit, which derives a three-dimensional reference image from the volume data using parallel volume rendering and displays the three-dimensional reference image; a virtual endoscopic image display control unit, which applies position and direction information of a virtual camera used for collecting virtual endoscopic image information to a predetermined perspective ray-casting algorithm, thereby generating image information, and displays a virtual endoscopic image based on the generated image information; a user interface unit, which receives a user's operating signal; and a controller, which when the operating signal for changing image information displayed by one among the two-dimensional reference image display control unit, the three-dimensional reference image display control unit, and the virtual endoscopic image display control unit is input through the user interface unit, controls the two- and three-dimensional reference image display control units and the virtual endoscopic image display control unit to be associated with one another based on the operating signal.

According to another aspect of the present invention, there is provided a method of displaying a three-dimensional virtual endoscopic image. The method includes inputting information on a virtual endoscopic image in the form of volume data expressed as a function of three-dimensional position; detecting a two-dimensional reference image, a three-dimensional reference image, and a virtual endoscopic image from the volume data; displaying the two-dimensional reference image, the three-dimensional reference image, and the virtual endoscopic image on one screen; displaying virtual cameras on areas, respectively, in which the two-dimensional reference image and the three-dimensional reference image are respectively displayed, wherein a camera display sphere and a camera display circle are defined on the basis of a current position of each virtual camera; and when information regarding to one image among the two-dimensional reference image, the three-dimensional reference image, and the virtual endoscopic image, which are displayed on one screen, is changed by a user's operation, changing information regarding to the other images based on the information that has been changed by the user's operation.

BRIEF DESCRIPTION OF THE DRAWINGS

FIG. 1A is a block diagram of a two-dimensional reference image display control unit according to the embodiment of the present invention.

FIG. 1B is a block diagram of a three-dimensional reference image display control unit according to the embodiment of the present invention.

FIG. 2B is a flowchart of a procedure of changing a display area according to the embodiment of the present invention.

BEST MODE FOR CARRYING OUT THE INVENTION

Hereinafter, embodiments of the present invention will be described in detail with reference to the attached drawings.

Figure 1:
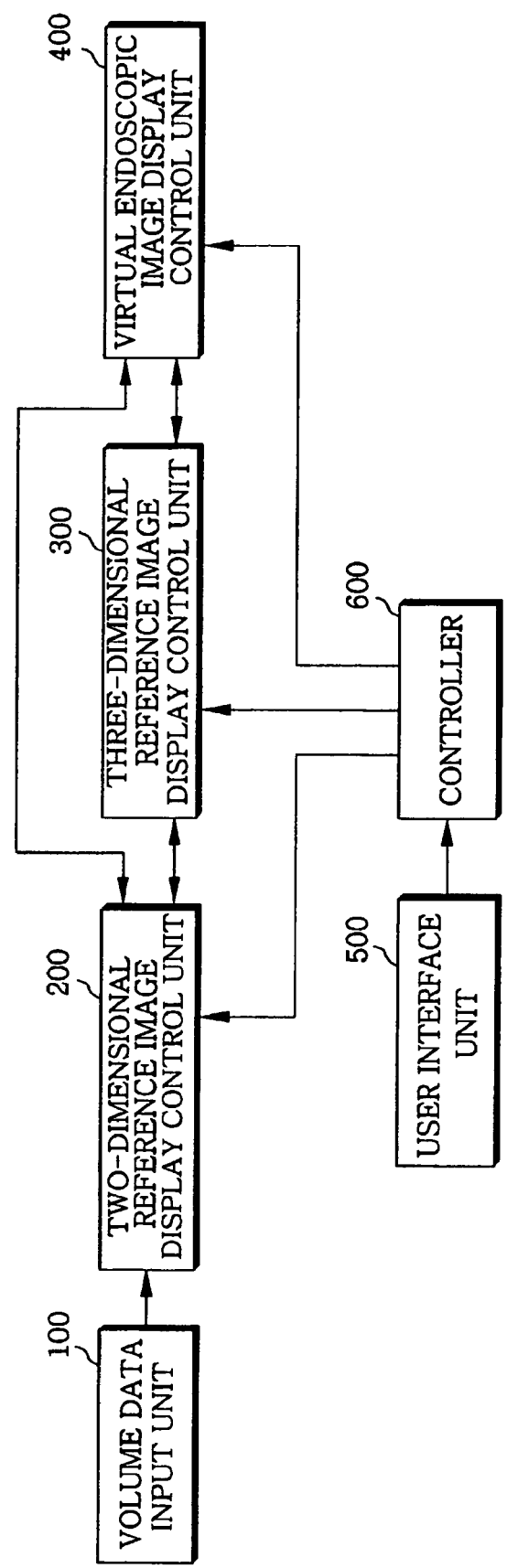
FIG. 1 is a schematic block diagram of an apparatus for displaying a three-dimensional virtual endoscopic image according to an embodiment of the present invention.

FIG. 1 is a schematic block diagram of an apparatus for displaying a three-dimensional virtual endoscopic image according to an embodiment of the present invention. Referring to FIG. 1, the apparatus for displaying a three-dimensional virtual endoscopic image includes volume data input unit 100, a two-dimensional reference image display control unit 200, a three-dimensional reference image display control unit 300, a virtual endoscopic image display control unit 400, a user interface unit 500, and a controller 600.

The volume data input unit 100 inputs information on a virtual endoscopic image in the form of volume data expressed as a function of three-dimensional position. For example, in a case where volume data, which is generated as the result of computed tomography (CT) scan or magnetic resonance imaging (MRI), is directly received from each device and then stored, the volume data input unit 100 can be composed of connection hardware connected to the device in order to receive volume data and a hard disc or memory device storing the received volume data. Alternatively, in a case where data, which has already been measured and stored in other storage media (for example, a floppy disc and a CD-ROM), is read, the volume data input unit 100 can be composed of connection hardware connected to internal/external storage devices of systems for these storage media in order to receive the data and a hard disc or memory device storing the received data.

The two-dimensional reference image display control unit 200 derives a two-dimensional reference image from the volume data and displays it.

The three-dimensional reference image display control unit 300 derives a three-dimensional reference image from the volume data using parallel volume rendering and displays it.

The virtual endoscopic image display control unit 400 applies the position and direction information of a virtual camera used for collecting virtual endoscopic image information to a predetermined perspective ray-casting algorithm, thereby generating image information, and displays a virtual endoscopic image based on the generated image information.

When an operating signal for changing image information displayed by one among the two-dimensional reference image display control unit 200, the three-dimensional reference image display control unit 300, and the virtual endoscopic image display control unit 400 is input through the user interface unit 500, the controller 600 controls the three display control units 200, 300, and 400 to be associated with one another based on the operating signal. In other words, the controller 600 controls the two- and three-dimensional reference images and the virtual endoscopic image to be associated with one another.

Referring to FIG. 1A, the two-dimensional reference image display control unit 200 includes a control signal input section 210, an image information receiver 220, a painting section 230, a display area control section 240, a camera control section 250, a display format determining section 260, a two-dimensional image generator 270, an image information support section 280, and an image information display section 290.

The two-dimensional reference image display control unit 200 is largely divided into an input unit, which receives a control signal for changing a two-dimensional reference image; a main processing unit, which generates changed information with respect to the two-dimensional reference image based on the control signal; and an output unit, which outputs the changed information. The input unit includes the control signal input section 210 and the image information receiver 220. The main processing unit includes the painting section 230, the display area control section 240, the camera control section 250, the display format determining section 260, and the two-dimensional image generator 270. The output unit includes the image information support section 280 and the image information display section 290. The image information support section 280 transmits the changed information to the other image display control units 300 and 400 so that the changed information regarding to the two-dimensional reference image can be applied to the other images, i.e., a three-dimensional reference image and a virtual endoscopic image. The image information display section 290 displays the two-dimensional reference image based on the changed information.

The control signal input section 210 receives a control signal for controlling a two-dimensional reference image among the operating signal input through the user interface unit 500 shown in FIG. 1. The image information receiver 220 receives changed three-dimensional reference image information from the three-dimensional reference image display control unit 300 shown in FIG. 1 and changed virtual endoscopic image information from the virtual endoscopic image display control unit 400 shown in FIG. 1.

Upon receiving painting information regarding to a region of interest in the two-dimensional reference image through the control signal input section 210, the painting section 230 changes two-dimensional reference image information based on the painting information and then transmits the changed information to the image information support section 280 and the image information display section 290 so that the changed content can be applied to all of the two-dimensional reference image, the three-dimensional reference image, and the virtual endoscopic image.

The display area control section 240 changes the two-dimensional reference image information based on position change information regarding to a region of interest in the two-dimensional reference image, which is received through the control signal input section 210, or position change information regarding to a region of interest in the three-dimensional reference image or the virtual endoscopic image, which is received through the image information receiver 220. For example, when a user changes a region of interest in a two-dimensional reference image through a user interface, such as a scroll bar appearing on a screen or a mouse wheel, changed information is applied to the two-dimensional reference image, and the corresponding regions of interest in both three-dimensional reference image and virtual endoscopic image are also changed based on information about the region of interest in the two-dimensional reference image.

The camera control section 250 changes virtual camera display information with respect to the two-dimensional reference image based on virtual camera display information regarding to the two-dimensional reference image, which is received through the control signal input section 210, or virtual camera display information regarding to the three-dimensional reference image and the virtual endoscopic image, which is received through the image information receiver 220.

The display format determining section 260 determines one among an axial image, a coronal image, a sagittal image, and a path MPR image as the format of the two-dimensional reference image based on display information with respect to the two-dimensional reference image, which is received through the control signal input section 210. The axial image is a two-dimensional image having the same z-value. The coronal image is a two-dimensional image having the same y-value. The sagittal image is a two-dimensional image having the same x-value.

Upon receiving changed three-dimensional reference image information and changed virtual endoscopic image information from the image information receiver 220, the two-dimensional image generator 270 converts the received three-dimensional reference image and virtual endoscopic image information to two-dimensional image information so that the received image information is applied to the two-dimensional reference image.

The image information display section 290 detects a changed two-dimensional reference image based on the two-dimensional reference image information received from the painting section 230, the display area control section 240, the camera control section 250, the display format determining section 260, and the two-dimensional image generator 270, and displays the changed two-dimensional reference image.

When the two-dimensional reference image information is changed in the painting section 230, the display area control section 240, and the camera control section 250 in response to the control signals received from the control signal input section 210, the image information support section 280 transmits the changed two-dimensional reference image information to the three-dimensional reference image display control unit 300 and the virtual endoscopic image display control unit 400 so that the changed two-dimensional reference image information is applied to a three-dimensional reference image and a virtual endoscopic image.

Referring to FIG. 1B, the three-dimensional reference image display control unit 300 includes a control signal input section 310, an image information receiver 320, a painting section 330, a display area control section 340, a camera control section 350, a three-dimensional volume rendering section 360, an image information support section 370, and an image information display section 380.

Like the two-dimensional reference image display control unit 200, the three-dimensional reference image display control unit 300 is largely divided into an input unit, which receives a control signal for changing a three-dimensional reference image; a main processing unit, which generates changed information with respect to the three-dimensional reference image based on the control signal; and an output unit, which outputs the changed information. The input unit includes the control signal input section 310 and the image information receiver 320. The main processing unit includes the painting section 330, the display area control section 340, the camera control section 350, and the three-dimensional volume rendering section 360. The output unit includes the image information support section 370 and the image information display section 380. The image information support section 370 transmits the changed information to the other image display control units 200 and 400 so that the changed information regarding to the three-dimensional reference image can be applied to the other images, i.e., a two-dimensional reference image and a virtual endoscopic image. The image information display section 380 displays a three-dimensional reference image based on the changed information.

The control signal input section 310 receives a control signal for controlling a three-dimensional reference image among the operating signal input through the user interface unit 500 shown in FIG. 1. The image information receiver 320 receives changed two-dimensional reference image information from the two-dimensional reference image display control unit 200 shown in FIG. 1 and changed virtual endoscopic image information from the virtual endoscopic image display control unit 400 shown in FIG. 1.

Upon receiving painting information regarding to a region of interest in the three-dimensional reference image through the control signal input section 310, the painting section 330 changes three-dimensional reference image information based on the painting information and then transmits the changed information to the image information support section 370 and the image information display section 380 so that the changed content can be applied to all of the three-dimensional reference image, the two-dimensional reference image, and the virtual endoscopic image.

The display area control section 340 changes the three-dimensional reference image information based on position change information regarding to a region of interest in the three-dimensional reference image, which is received through the control signal input section 310, or position change information regarding to a region of interest in the two-dimensional reference image or the virtual endoscopic image, which is received through the image information receiver 320. For example, a new two-dimensional reference image display straight line can be displayed on the three-dimensional reference image, and a slice locator can be directly dragged on the three-dimensional reference image to change the position of a two-dimensional reference image.

The camera control section 350 changes virtual camera display information with respect to the three-dimensional reference image based on virtual camera display information regarding to the three-dimensional reference image, which is received through the control signal input section 310, or virtual camera display information regarding to the two-dimensional reference image and the virtual endoscopic image, which is received through the image information receiver 320.

Upon receiving changed two-dimensional reference image information and changed virtual endoscopic image information from the image information receiver 320, the three-dimensional volume rendering section 360 performs three-dimensional volume rendering based on the received image information. For example, the three-dimensional volume rendering section 360 receives the result of performing painting operation on a virtual endoscopic image and the result of performing painting operation on a two-dimensional reference image from the image information receiver 320 and performs three-dimensional rendering. Three-dimensional rendering is a process of adding three-dimensional texture such as shadow or a change in color or depth of color to an object, thereby giving reality to computer graphics.

The image information display section 380 detects a changed three-dimensional reference image based on the three-dimensional reference image information received from the painting section 330, the display area control section 340, the camera control section 350, and the three-dimensional volume rendering section 360, and displays the changed three-dimensional reference image.

When the three-dimensional reference image information is changed in the painting section 330, the display area control section 340, and the camera control section 350 in response to the control signals received from the control signal input section 310, the image information support section 370 transmits the changed three-dimensional reference image information to the two-dimensional reference image display control unit 200 and the virtual endoscopic image display control unit 400 so that the changed three-dimensional reference image information is applied to a two-dimensional reference image and a virtual endoscopic image.

Figure 1C:
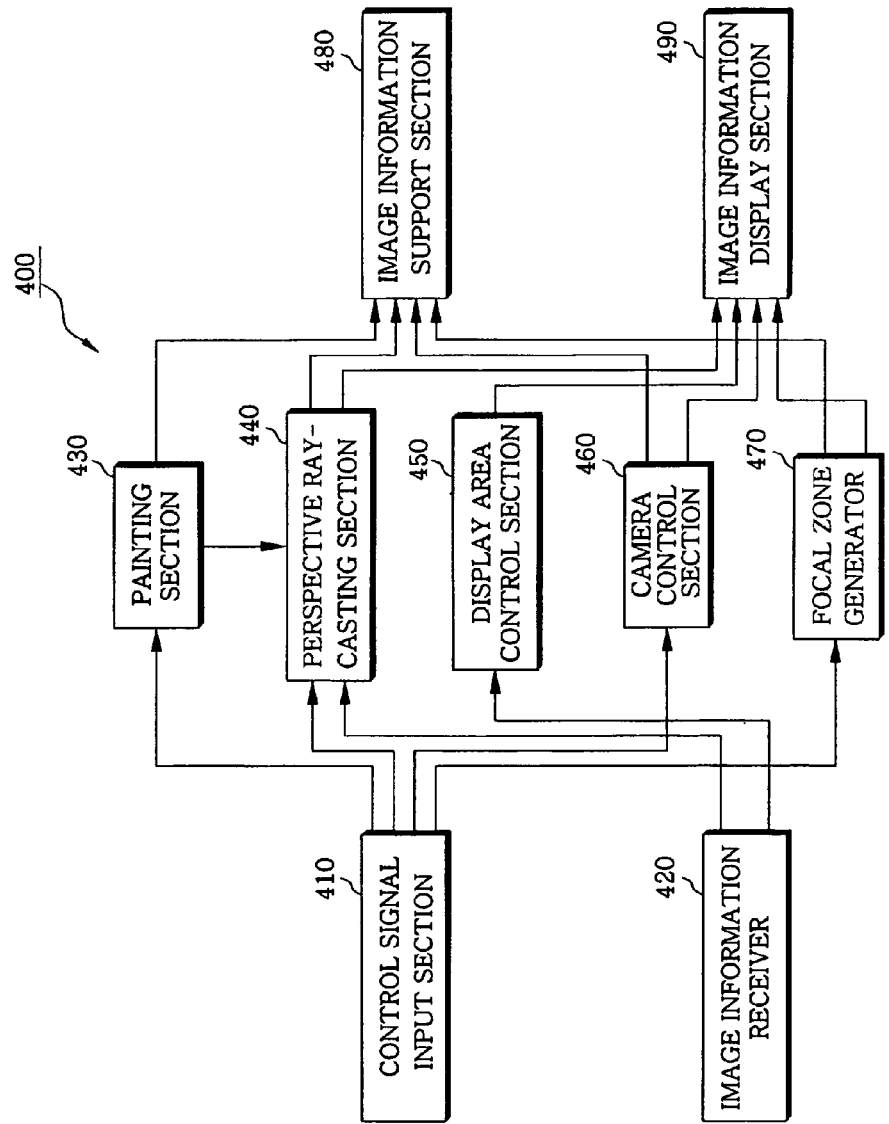
FIG. 1C is a block diagram of a virtual endoscopic image display control unit according to the embodiment of the present invention.

Referring to FIG. 1C, the virtual endoscopic image display control unit 400 includes a control signal input section 410, an image information receiver 420, a painting section 430, a perspective ray-casting section 440, a display area control section 450, a camera control section 460, a focal zone generator 470, an image information support section 480, and an image information display section 490.

Like the two-dimensional reference image display control unit 200 and the three-dimensional reference image display control unit 300, the virtual endoscopic image display control unit 400 is largely divided into an input unit, which receives a control signal for changing a virtual endoscopic image; a main processing unit, which generates changed information with respect to the virtual endoscopic image based on the control signal; and an output unit, which outputs the changed information. The input unit includes the control signal input section 410 and the image information receiver 420. The main processing unit includes the painting section 430, the perspective ray-casting section 440, the display area control section 450, the camera control section 460, and the focal zone generator 470. The output unit includes the image information support section 480 and the image information display section 490. The image information support section 480 transmits the changed information to the other image display control units 200 and 300 so that the changed information regarding to the virtual endoscopic image can be applied to the other images, i.e., a two-dimensional reference image and a three-dimensional reference image. The image information display section 490 displays the virtual endoscopic image based on the changed information.

The control signal input section 410 receives a control signal for controlling a virtual endoscopic image among the operating signal input through the user interface unit 500 shown in FIG. 1. The image information receiver 420 receives changed two-dimensional reference image information from the two-dimensional reference image display control unit 200 shown in FIG. 1 and changed three-dimensional reference image information from the three-dimensional reference image display control unit 300 shown in FIG. 1.

Upon receiving painting information regarding to a region of interest in the virtual endoscopic image through the control signal input section 410, the painting section 430 changes virtual endoscopic image information based on the painting information and then transmits the changed information to the image information support section 480 so that the changed content can be applied to the two-dimensional reference image and the three-dimensional reference image. The painting section 430 also transmits the changed information to the perspective ray-casting section 440 so that the changed content can be applied to the virtual endoscopic image.

The perspective ray-casting section 440 applies the processing result received from the painting section 430 and the changed two- and three-dimensional reference image information received from the image information receiver 420 to a predetermined perspective ray-casting algorithm so as to adjust the opacity of a region of interest, and then changes the virtual endoscopic image information based on the result of the adjustment. The perspective ray-casting algorithm is a process of accumulating brightness of points, where light beams diverging in different directions from the same start point meet an object, on a projection plane so as to generate an image. Since it is widely known, a detailed description thereof will be omitted.

The display area control section 450 changes the virtual endoscopic image information based on position change information regarding to a region of interest in the two- or three-dimensional reference image, which is received through the image information receiver 420. In other words, when changed information regarding to the region of interest is received from the two-dimensional reference image display control unit 200 or the three-dimensional reference image display control unit 300, the display area control section 450 renders the two- or three-dimensional reference image in the region of interest on the virtual endoscopic image. For example, in a case where a two-dimensional axial image is rendered on the virtual endoscopic image, when a plurality of light beams diverging from one point meet the surface of an object, if the z-value of a voxel corresponding to the surface is the same as the z-value of the two-dimensional axial image, the display area control section 450 changes the color of the voxel.

The camera control section 460 changes the virtual endoscopic image information based on the position and direction information of a virtual camera, which is received through the control signal input section 410, and displays the result of the change through the image information display section 490 or applies it to the other images through the image information support section 480.

The focal zone generator 470 designates a region of a user's interest on a virtual endoscopic image based on the control signal transmitted through the control signal input section 410. In other words, if a user selects a region of interest on a virtual endoscopic image screen, the focal zone generator 470 defines the region of interest as a focal zone and transmits the result of the definition to the image information display section 490 or the image information support section 480 so that the result of the definition is displayed or applied to two- and three-dimensional reference images. Accordingly, a correlation between each reference image and the virtual endoscopic image can be effectively shown.

The focal zone is a region defined on a screen and does not change when a new virtual endoscopic image is generated due to a change in the position or direction information of the virtual camera. Volume rendering is performed to generate a three-dimensional reference image so that the region of volume data included in the focal zone defined on the virtual endoscopic image screen is distinguished from the remaining region.

For example, if the focal zone is a quadrilateral, four planes defined by Formula (1) are generated in three-dimensional space.

$$f_1(x)=a_1x+b_1y+c_1y+d_1=0$$
$$f_2(x)=a_2x+b_2y+c_2y+d_2=0$$
$$f_3(x)=a_3x+b_3y+c_3y+d_3=0$$
$$f_4(x)=a_4x+b_4y+c_4y+d_4=0 \qquad (1)$$

Here, if the region of volume data is included in the focal zone, Formula (2) is satisfied.

$$f_1(x)<0, f_2(x)<0, f_1(x)<0, f_4(x)<0 \qquad (2)$$

The focal zone can be determined with respect to other primitives, using a similar method to the above-described one.

The image information display section 490 detects a changed virtual endoscopic image based on the virtual endoscopic image information received from the perspective ray-casting section 440, the display area control section 450, the camera control section 460, and the focal zone generator 470, and displays the changed virtual endoscopic image.

When the virtual endoscopic image information is changed in the painting section 430, the perspective ray-casting section 440, the camera control section 460, and the focal zone generator 470 in response to the control signal received from the control signal input section 410, the image information support section 480 transmits the changed virtual endoscopic image information to the two-dimensional reference image display control unit 200 and the three-dimensional reference image display control unit 300 so that the changed virtual endoscopic image information is applied to a two-dimensional reference image and a three-dimensional reference image.

Referring to FIGS. 1A through 1C, the image display control units 200, 300, and 400 receive changed information regarding to different images than their own from the other image display control units using the respective image information receivers 220, 320, and 420 and transmit their own changed image information to the other image display control units using the respective image information support sections 280, 370, and 480. Accordingly, all of the different images are associated with one another.

Figure 2:
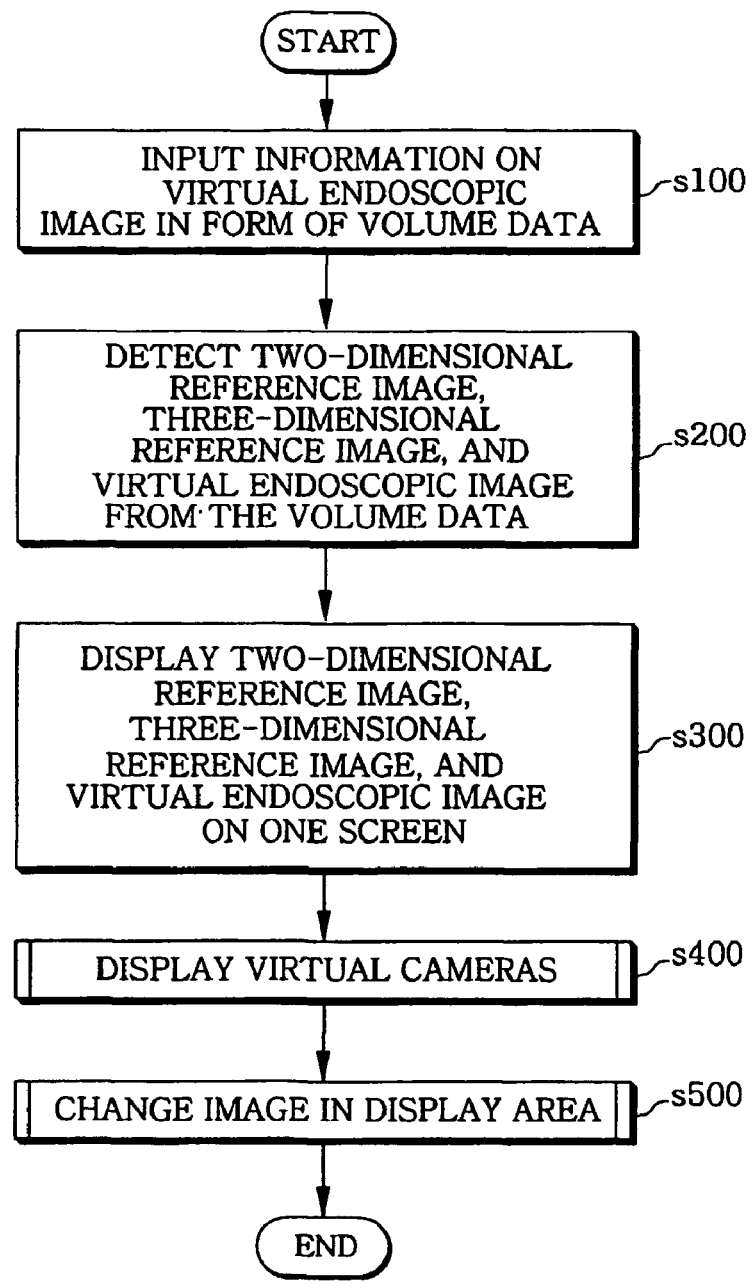
FIG. 2 is a flowchart of a method of displaying a three-dimensional virtual endoscopic image according to an embodiment of the present invention.

A method of displaying a three-dimensional virtual endoscopic image according to an embodiment of the present invention will be described below with reference to FIG. 2.

Information on a virtual endoscopic image is input in the form of volume data expressed in a three-dimensional position function in step s100. Here, the volume data is generated through CT scan or MRI.

A two-dimensional reference image, a three-dimensional reference image, and a virtual endoscopic image are detected from the volume data in step s200. Two-dimensional image generation is performed in order to detect the two-dimensional reference image from the volume data. Parallel volume rendering is performed in order to detect the three-dimensional reference image from the volume data. The position and direction information of a virtual camera is applied to a predetermined perspective ray-casting algorithm in order to detect the virtual endoscopic image from the volume data.

Thereafter, the two-dimensional reference image, the three-dimensional reference image, and the virtual endoscopic image are displayed on one screen in step s300. In other words, a display area on the screen is divided into three sub areas, and the three images are displayed on the respective three sub areas. It is preferable that a sub area for displaying the virtual endoscopic image is largest and is located at the center of the display area.

Virtual cameras are displayed on the respective sub areas, in which the two- and three-dimensional reference images are displayed, in step s400. With respect to each of the virtual cameras, a camera display sphere and a camera display circle are provided centering around the current position of each virtual camera. For example, in a case of a two-dimensional reference image, a sphere having a predetermined radius from the current position of a virtual camera is displayed as a camera display sphere, and a circle composed of intersection points between the camera display sphere and the current two-dimensional reference image is displayed as a camera display circle. In a case of a three-dimensional reference image, a sphere having a predetermined radius from the current position of a virtual camera is displayed as a camera display sphere, and a circle composed of intersection points between a plane, which passes the current position of the virtual camera displayed on the three-dimensional reference image and parallel with the screen, and the camera display sphere is displayed as a camera display circle.

The direction of a virtual camera is represented with an arrow. On the assumption that there is an infinite ray in the direction of the virtual camera, an intersection point between the infinite ray and a camera display sphere is detected, and then the direction of the virtual camera is represented with an arrow starting from the center of the virtual camera and passing the intersection point. In order to identify whether the virtual camera faces the surface of the hemisphere in front or the rear of an image, different colors are used for the camera display circle and the virtual camera. For example, when the virtual camera faces the surface of the hemisphere in front of the image, the camera display circle and the virtual camera are colored in red. Conversely, when the virtual camera faces the surface of the hemisphere in the rear of the image, the camera display circle and the virtual camera are colored in blue. Examples of a method of displaying a virtual camera will be described later more specifically with reference to FIGS. 3A through 3E.

In the meantime, when one of the images displayed on the screen is changed by a user's operation, the other images are changed based on changed image information in association with one another in step s500.

Figure 2A:
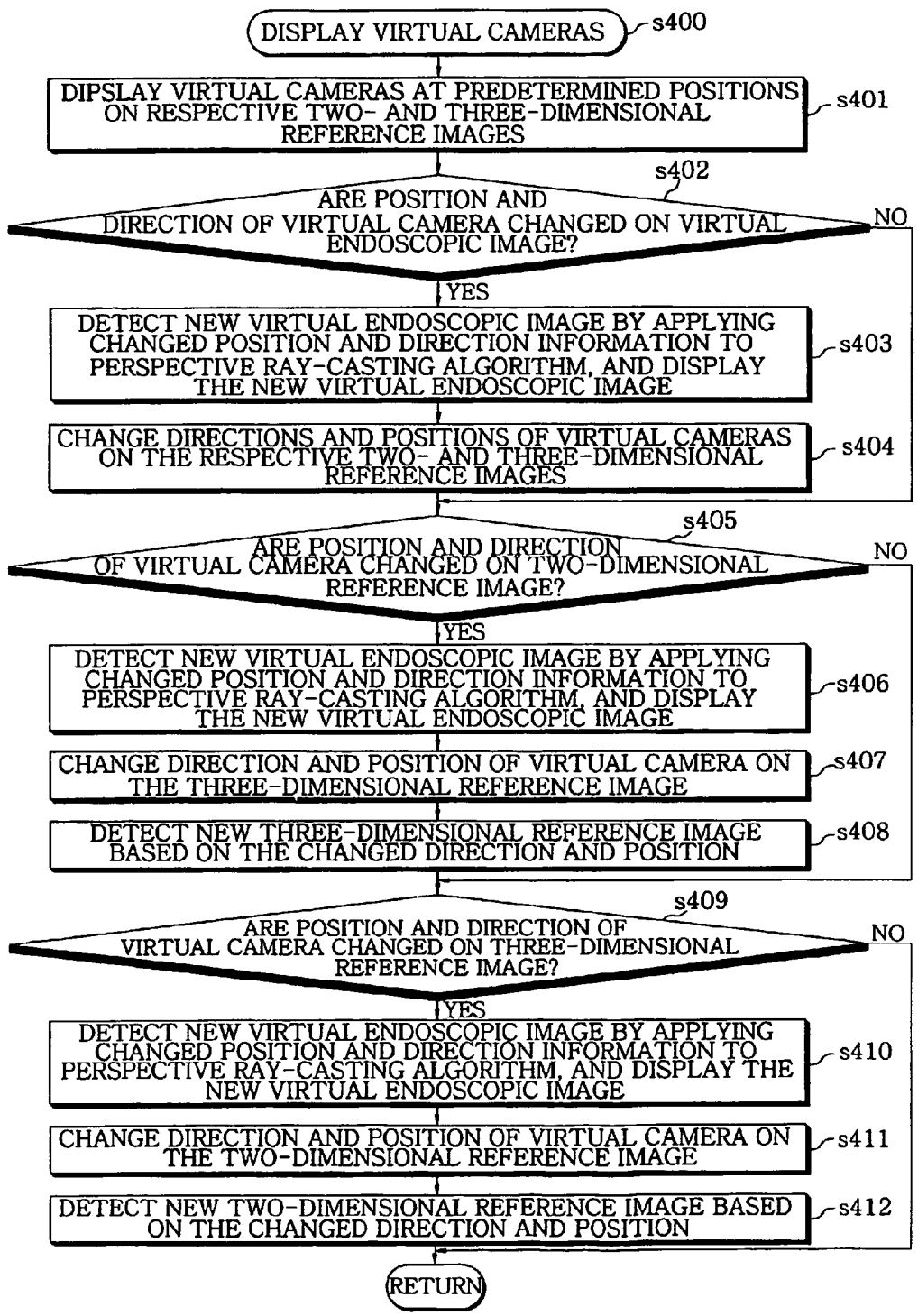
FIG. 2A is a flowchart of a procedure of displaying virtual cameras according to the embodiment of the present invention.

FIG. 2A is a flowchart of a procedure of displaying a virtual camera according to the embodiment of the present invention. Referring to FIG. 2A, the virtual cameras are displayed at predetermined positions on the respective two- and three-dimensional reference images in step s401.

If the position and direction of the virtual camera are changed on the virtual endoscopic image in step s402, the changed position and direction information is applied to the predetermined perspective ray-casting algorithm to detect a new virtual endoscopic image and the new virtual endoscopic image is displayed in step s403. The positions and directions of the virtual cameras displayed on the respective two- and three-dimensional reference images are changed based on the changed position and direction information regarding to the virtual camera on the virtual endoscopic image in step s404. If the position and direction of the virtual camera are changed on the two-dimensional reference image in step s405, the changed position and direction information is applied to the predetermined perspective ray-casting algorithm to detect a new virtual endoscopic image and the new virtual endoscopic image is displayed in step s406. The position and direction of the virtual camera displayed on the three-dimensional reference image are changed based on the changed position and direction information regarding to the virtual camera on the two-dimensional reference image in step s407. A new three-dimensional reference image is detected based on the changed position and direction information regarding to the old three-dimensional reference image in step s408. If the position and direction of the virtual camera are changed on the three-dimensional reference image in step s409, the changed position and direction information is applied to the predetermined perspective ray-casting algorithm to detect a new virtual endoscopic image and the new virtual endoscopic image is displayed in step s410. The position and direction of the virtual camera displayed on the two-dimensional reference image are changed based on the changed position and direction information regarding to the virtual camera on the three-dimensional reference image in step s411. A new two-dimensional reference image is detected based on the changed position and direction information regarding to the old two-dimensional reference image in step s412.

FIG. 2B is a flowchart of a procedure of changing an image in a display area according to the embodiment of the present invention.

Referring to FIG. 2B, when one among the two-dimensional reference image, the three-dimensional reference image, and the virtual endoscopic image, which are displayed on the same screen, is changed, the following operation is performed in order to change the other images in association with one another.

If information regarding to the two-dimensional reference image is changed in step s501, the changed information is applied to the two-dimensional reference image in step s502. Next, the changed information is applied to the virtual endoscopic image using the predetermined perspective ray-casting algorithm in step s503 and is applied to the three-dimensional reference image using three-dimensional volume rendering in step s504. If information regarding to the three-dimensional reference image is changed in step s505, the changed information is applied to the three-dimensional reference image in step s506. Next, the changed information is applied to the virtual endoscopic image using the predetermined perspective ray-casting algorithm in step s507 and is applied to the two-dimensional reference image using two-dimensional image generation in step s508.

If information regarding to the virtual endoscopic image is changed by the user's operation in step s509, the changed information is applied to the virtual endoscopic image using the predetermined perspective ray-casting algorithm in step s510. Thereafter, the changed information is applied to the two-dimensional reference image using two-dimensional image generation in step s511 and is applied to the three-dimensional reference image using three-dimensional volume rendering in step s512.

FIGS. 3A through 3E show examples of a method of displaying and operating a virtual camera according to the embodiment of the present invention.

Figure 3A:
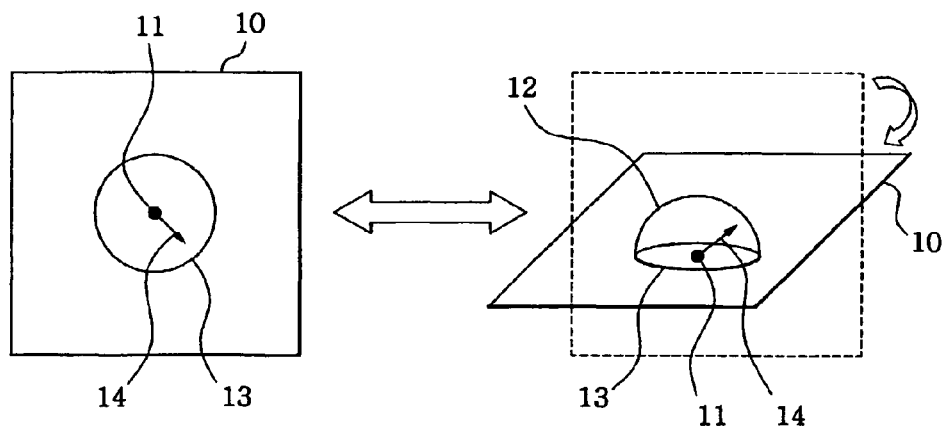
FIGS. 3A through 3E show examples of a method of displaying and operating a virtual camera according to the embodiment of the present invention.

FIG. 3A shows an example in which a virtual camera is displayed on a two-dimensional reference image. Referring to FIG. 3A, with respect to a two-dimensional reference image 10, a sphere (hereinafter, a camera display sphere) 12 having a predetermined radius from the current position of a virtual camera 11 is assumed. A set of intersection points between the camera display sphere 12 and the current two-dimensional reference image 10 is defined as a circle (hereinafter, referred to as a camera display circle) 13. Here, if it is assumed that an infinite ray exists in the direction of the virtual camera 11, the infinite ray meets the camera display sphere 12 at one point. An arrow 14 starting from the center of the virtual camera 11 and passing the intersection point between the camera display sphere 12 and the infinite ray indicates the direction of the virtual camera 11.

In a coordinate system having the center of the virtual camera 11 as an origin, the infinite ray with respect to the direction $d(d_x, d_y, d_z)$ of the virtual camera 11 is expressed by Formula (3).

$$x = d_x k, \; y = d_y k, \; z = d_z k \text{ (where k is a constant)} \qquad (3)$$

In the meantime, the camera display sphere 12 is expressed by Formula (4), and thus the coordinates of the intersection point between the infinite ray and the camera display sphere 12 are given by Formula (5) based on Formulae (3) and (4).

$$x^2 + y^2 + z^2 = r^2 \qquad (4)$$

$$x = d_x \bar{k}, \; y = d_y \bar{k}, \; z = d_z \bar{k} \left( \bar{k} = \sqrt{\frac{r^2}{d_x^2 + d_y^2 + d_z^2}} \right) \qquad (5)$$

Here, the virtual camera 11 may face the surface of a hemisphere in front or the rear of the two-dimensional reference image 10. In order to identify whether the virtual camera 11 faces the surface of the hemisphere in front or the rear of the two-dimensional reference image 10, different colors are used for the camera display circle 13 and the virtual camera 11.

Figure 3B:
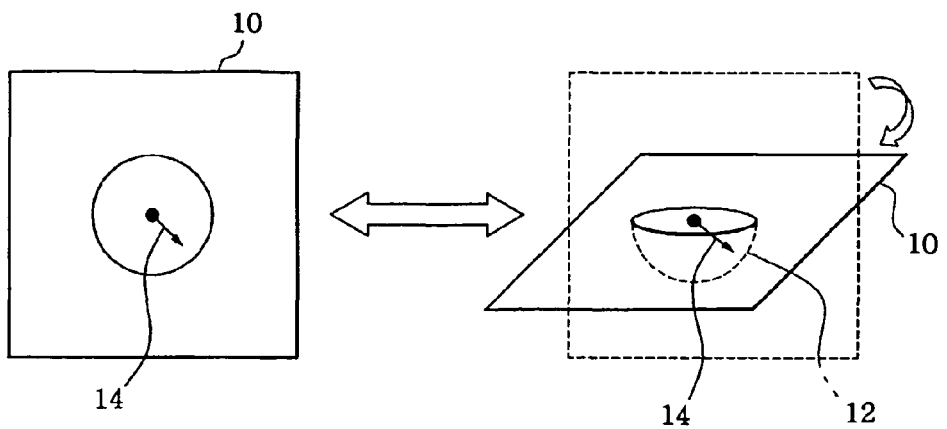

For example, the direction of the virtual camera 11 is the same in the plane views of FIGS. 3A and 3B. However, the virtual camera 11 in FIG. 3A faces the surface of the hemisphere in front of the two-dimensional reference image 10 while the virtual camera 11 in FIG. 3B faces the surface of the hemisphere in the rear of the two-dimensional reference image 10. Accordingly, the color of the camera display circle 13 and the virtual camera 11 shown in FIG. 3A is different from the color of the camera display circle 13 and the virtual camera 11 shown in FIG. 3B. For example, the camera display circle 13 and the virtual camera 11 are colored in red in FIG. 3A and colored in blue in FIG. 3B so that the front and the rear of the two-dimensional reference image 10 can be discriminated from each other.

Figure 3C:
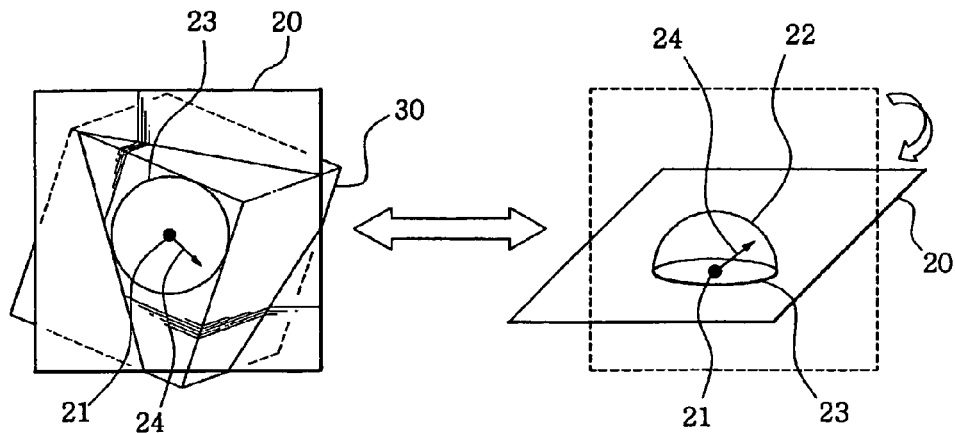

FIG. 3C shows an example, in which a virtual camera is displayed on a three-dimensional reference image. Referring to FIG. 3C, in order to display a virtual camera 21 on a three-dimensional reference image, a sphere having a predetermined radius from the current position of a virtual camera 21 is defined as a camera display sphere 22, and a set of the intersection points between the camera display sphere 22 and a plane 20, which passes the current position of the virtual camera 21 and is parallel with a screen displaying the three-dimensional reference image, is defined as a camera display circle 23.

Here, if it is assumed that an infinite ray exists in the direction of the virtual camera 21, the infinite ray intersects the camera display sphere 22 at one point. An arrow 24 starting from the center of the virtual camera 21 and passing the intersection point between the camera display sphere 22 and the infinite ray indicates the direction of the virtual camera 21.

In order to discriminate the direction of the virtual camera 21 facing the surface of a hemisphere in front of the plane 20 from the direction of the virtual camera 21 facing the surface of a hemisphere in the rear of the plane 20, different colors are used for the camera display circle 23 and the virtual camera 21.

Figure 3D:
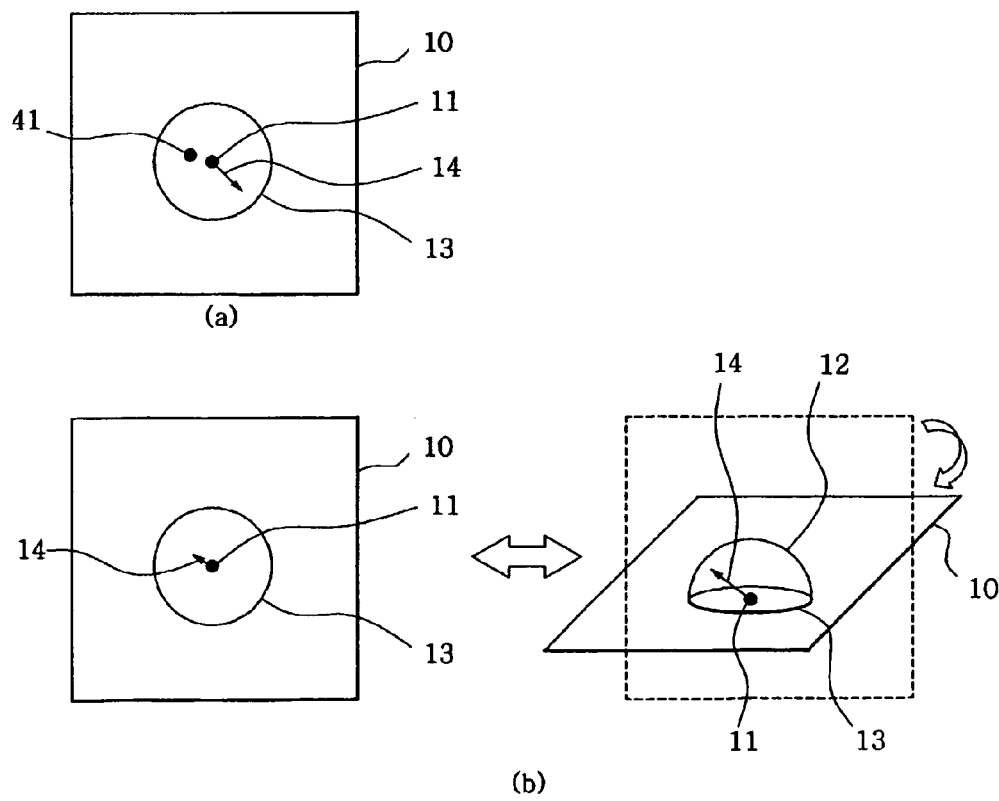
Figure 3E:
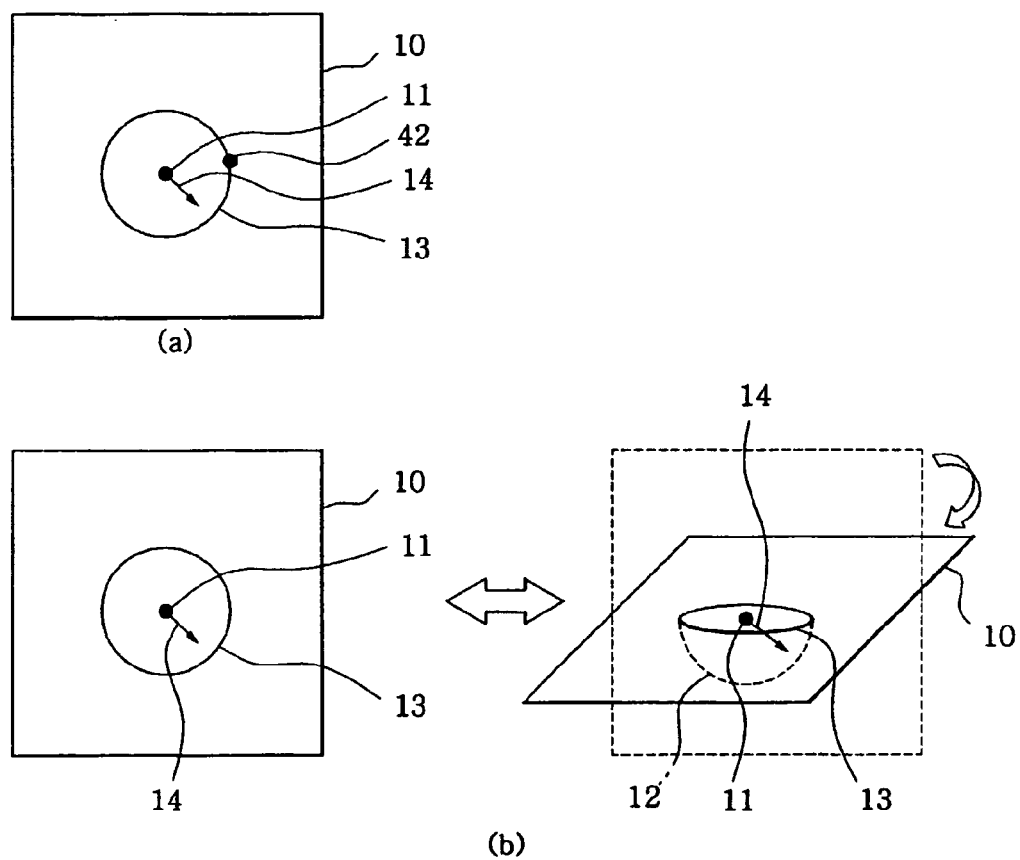

FIGS. 3D and 3E are diagrams for explaining a method of operating a virtual camera on a two-dimensional reference image, according to the present invention.

When the virtual camera 11 faces the surface of the hemisphere in front of the two-dimensional reference image 10 as shown in FIG. 3D(a), if a user clicks a predetermined position 41 within the camera display circle 13, an intersection point between the hemisphere and an infinite ray, which passes the predetermined position 41 and goes toward the front of the two-dimensional reference image 10, is calculated and the virtual camera 11 is adjusted to face the intersection point, as shown in FIG. 3D(b).

In a coordinate system having the center of the virtual camera 11 as an origin, the infinite ray, with respect to the direction $d(d_x,d_y,d_z)$ of the virtual camera 11 and the predetermined position 41 $p(p_x,p_y,p_z)$, is expressed by Formula (6).

$$x=p_x+d_xk,\ y=p_y+d_yk,\ z=p_z+d_zk\ \text{(where k is a constant)} \quad (6)$$

In the meantime, the camera display sphere 12 is expressed by Formula (4), and thus the coordinates of the intersection point between the infinite ray and the camera display sphere 12 are given by Formula (7) based on Formulae (6) and (4).

$$x=p_x+d_xk,\ y=p_y+d_yk,\ z=p_z+d_zk\ (\bar{k}\ \text{satisfies}\ (d^2_x+d^2_y+d^2_z)\bar{k}^2+2(p_xd_x+p_yd_y+p_zd_z)\bar{k}+p^2_x+p^2_y+p^2_z-r^2=0) \quad (7)$$

In the meantime, when the virtual camera 11 faces the surface of the hemisphere in front of the two-dimensional reference image 10 as shown in FIG. 3E(a), if a user clicks a predetermined position 42 on the camera display circle 13, the direction of the virtual camera 11 is converted to face the surface of the hemisphere in the rear of the two-dimensional reference image 10. In other words, in the case where the virtual camera 11 is colored in blue because it faces the front hemisphere, if one point on the camera display circle is clicked, the direction of the virtual camera 11 is symmetrically changed with respect to the two-dimensional reference image 10 so that the virtual camera 11 faces the rear hemisphere, as shown in FIG. 3E(b).

FIGS. 4A through 4G show examples of a three-dimensional virtual endoscopic image according to the embodiment of the present invention.

Figure 4A:
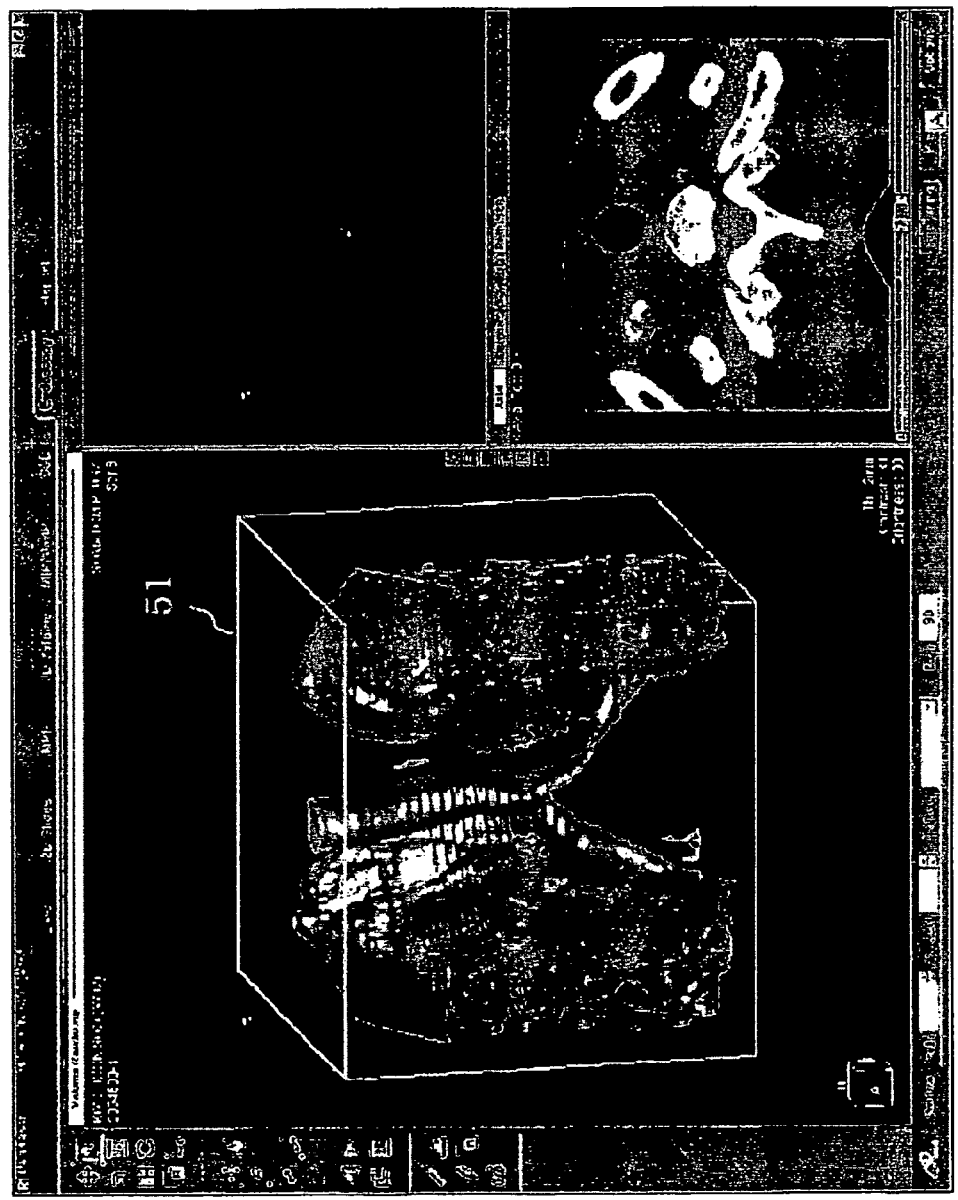
FIGS. 4A through 4G show examples of a three-dimensional virtual endoscopic image according to the embodiment of the present invention.

FIG. 4A shows a user interface of a virtual endoscopy system composed of a two-dimensional reference image, a three-dimensional reference image, and a virtual endoscopic image. Referring to FIG. 4A, in the virtual endoscopy system, the three-dimensional reference image is displayed on the right, the virtual endoscopic image is displayed on the upper right, and the two-dimensional reference image is displayed on the lower right. A two-dimensional reference image display line 51 is displayed on the three-dimensional reference image in order to indicate the position of an axial image, i.e., the current two-dimensional reference image.

Figure 4B:
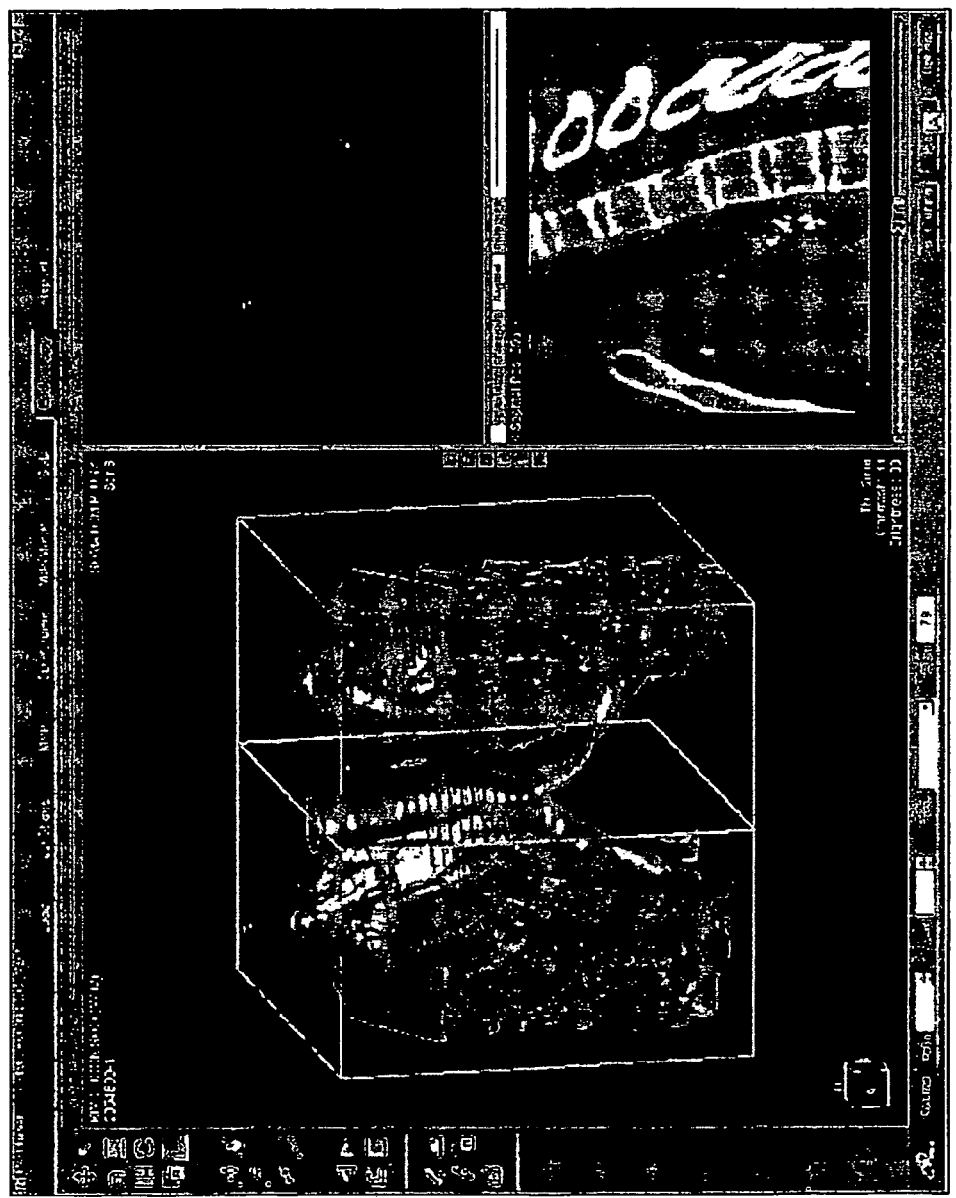

Although the axial image is shown as the two-dimensional reference image, a user can view the two-dimensional reference image in a desired format using buttons, i.e., Axial, Coronal, Sagittal, and Path MPR, in an image title bar. FIG. 4B shows an example of a sagittal image to which the axial image shown in FIG. 4A is converted by pressing the Sagittal button.

Figure 4C:
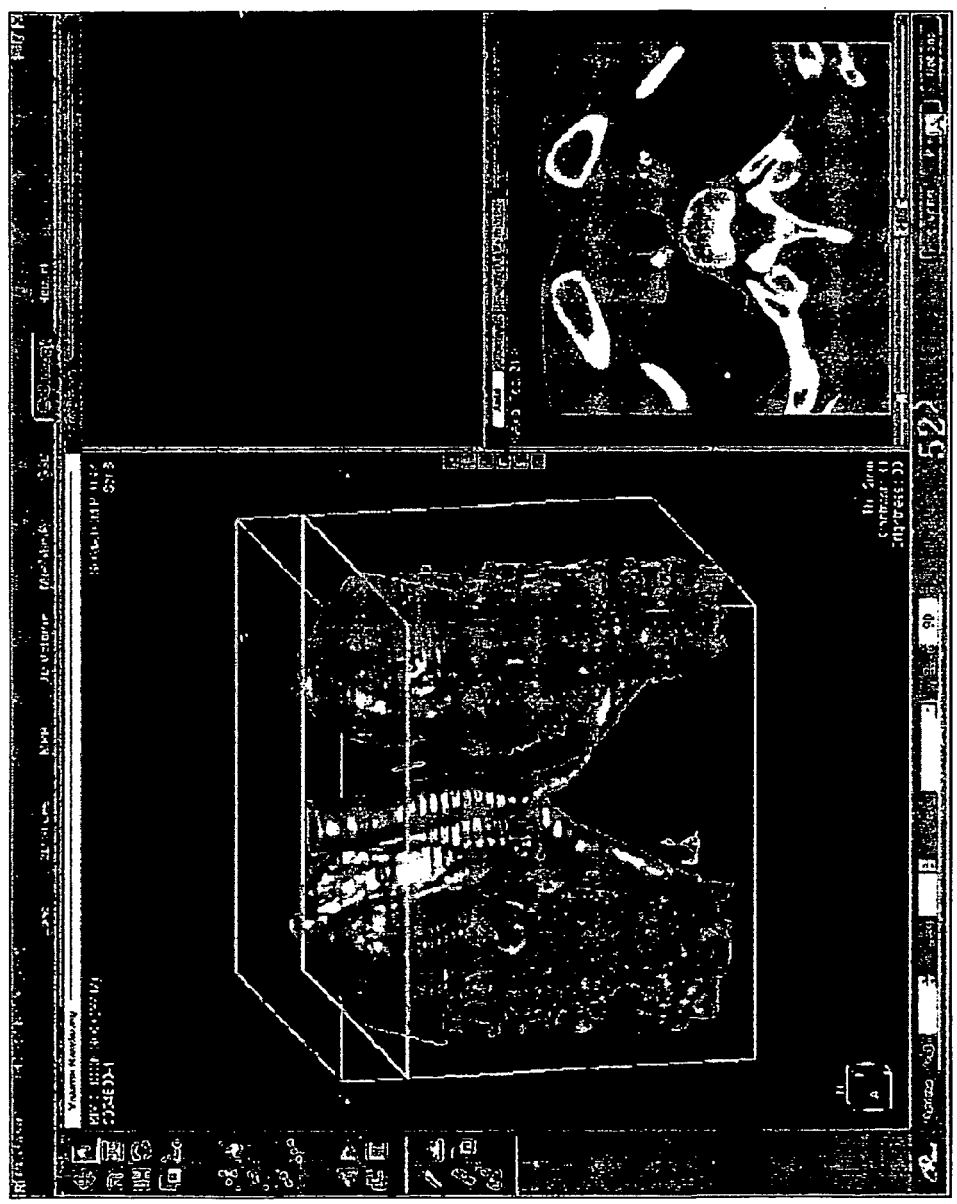
Figure 4D:
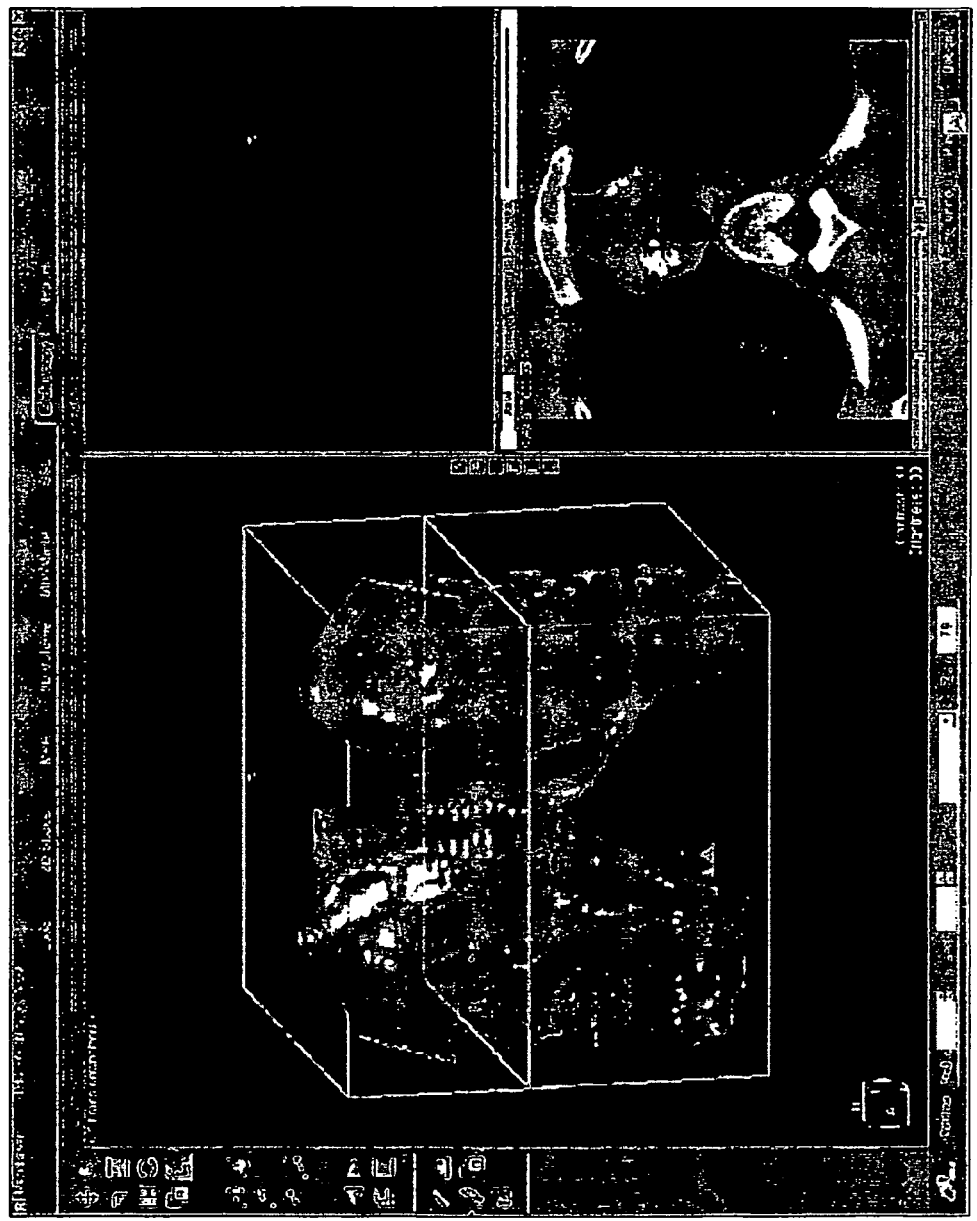

FIGS. 4C and 4D show the results of adjusting the position of the two-dimensional reference image shown in FIG. 4A. FIG. 4C shows the result of moving a scroll bar 52 located at the lower end of the two-dimensional reference image, and FIG. 4D shows the result of moving the two-dimensional reference image display line 51 displayed on the three-dimensional reference image using a mouse.

Figure 4E:
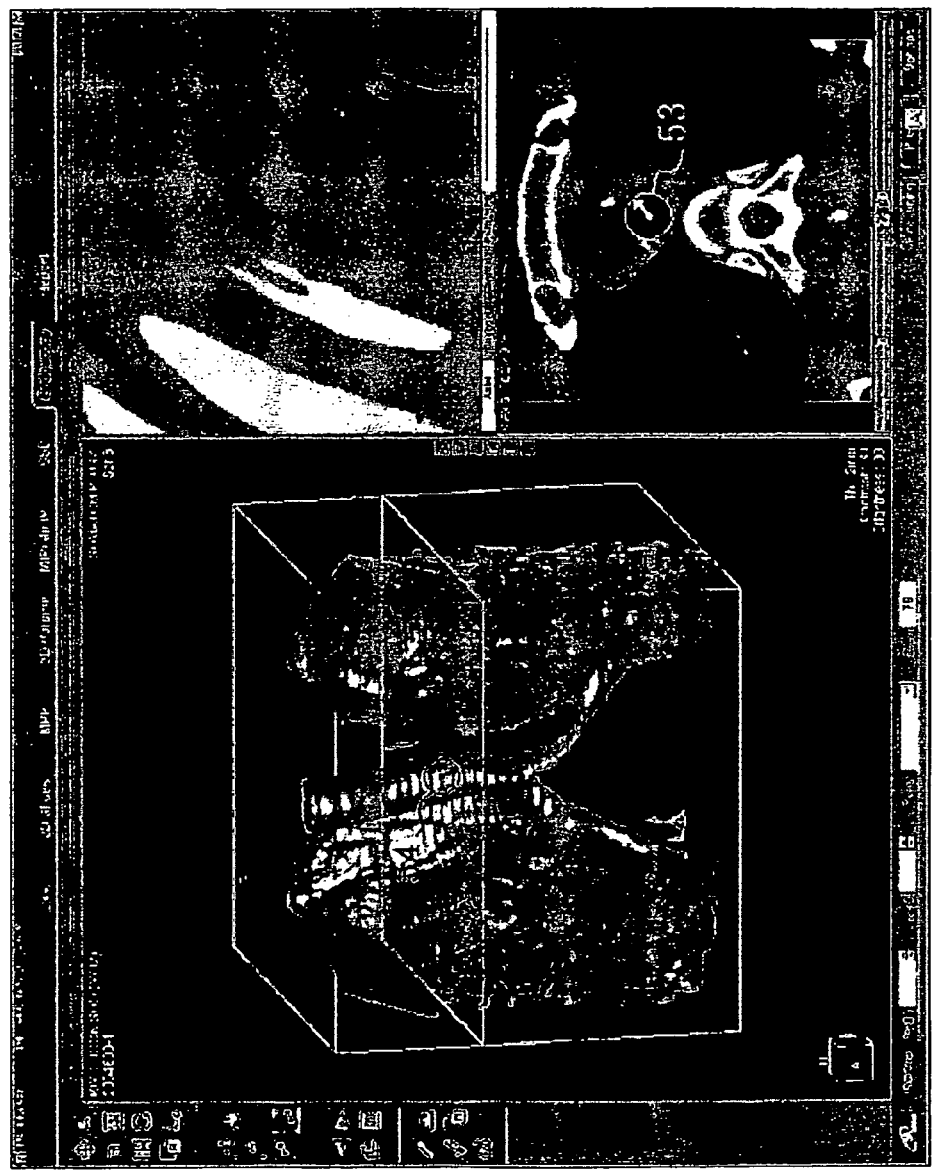

FIG. 4E shows an example of the case where a virtual camera positioned in a particular region of a bronchus is displayed on two- and three-dimensional reference image areas. Referring to FIG. 4E, virtual cameras 53 and 54 are displayed on the respective two- and three-dimensional reference images. Here, in order to identify whether the virtual camera 53 on the two-dimensional reference image faces above or below the two-dimensional reference image, different colors are used for the virtual camera 53. For example, in the case where the virtual camera 53 facing above the two-dimensional reference image is set to red color while the virtual camera 53 facing below the two-dimensional reference image is set to blue color, if the virtual camera 53 is colored in red on the two-dimensional reference image, it can be inferred that the virtual camera 53 faces above the two-dimensional reference image.

Like the case of the virtual camera 53 on the two-dimensional reference image, it is identified whether the virtual camera 54 on the three-dimensional reference image faces the front or rear of the three-dimensional reference image using the color of the virtual camera 54. For example, in the case where the virtual camera 54 facing the front of the three-dimensional reference image is set to red color while the virtual camera 54 facing the rear of the three-dimensional reference image is set to blue color, if the virtual camera 54 is colored in blue on the three-dimensional reference image, it can be inferred that the virtual camera 54 faces the rear of the three-dimensional reference image.

Figure 4F:
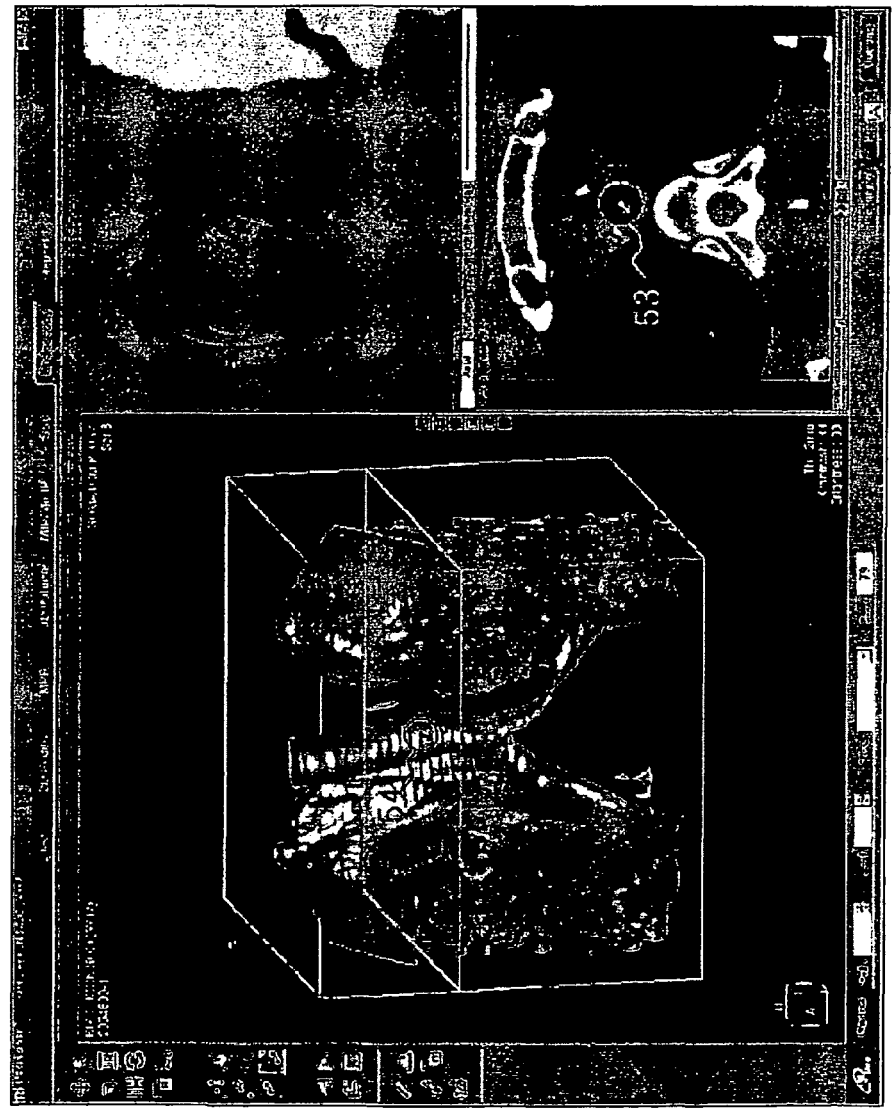

FIG. 4F shows the result of adjusting the direction of the virtual camera 53 on the two-dimensional reference image shown in FIG. 4E. In other words, FIG. 4F shows the result of changing the direction of the virtual camera 53 on the two-dimensional reference image by clicking a point within a camera display circle on the two-dimensional reference image shown in FIG. 4E. Accordingly, if the virtual camera 53 is colored in red before its direction is changed, it is colored in blue after its direction is changed.

Figure 4G:
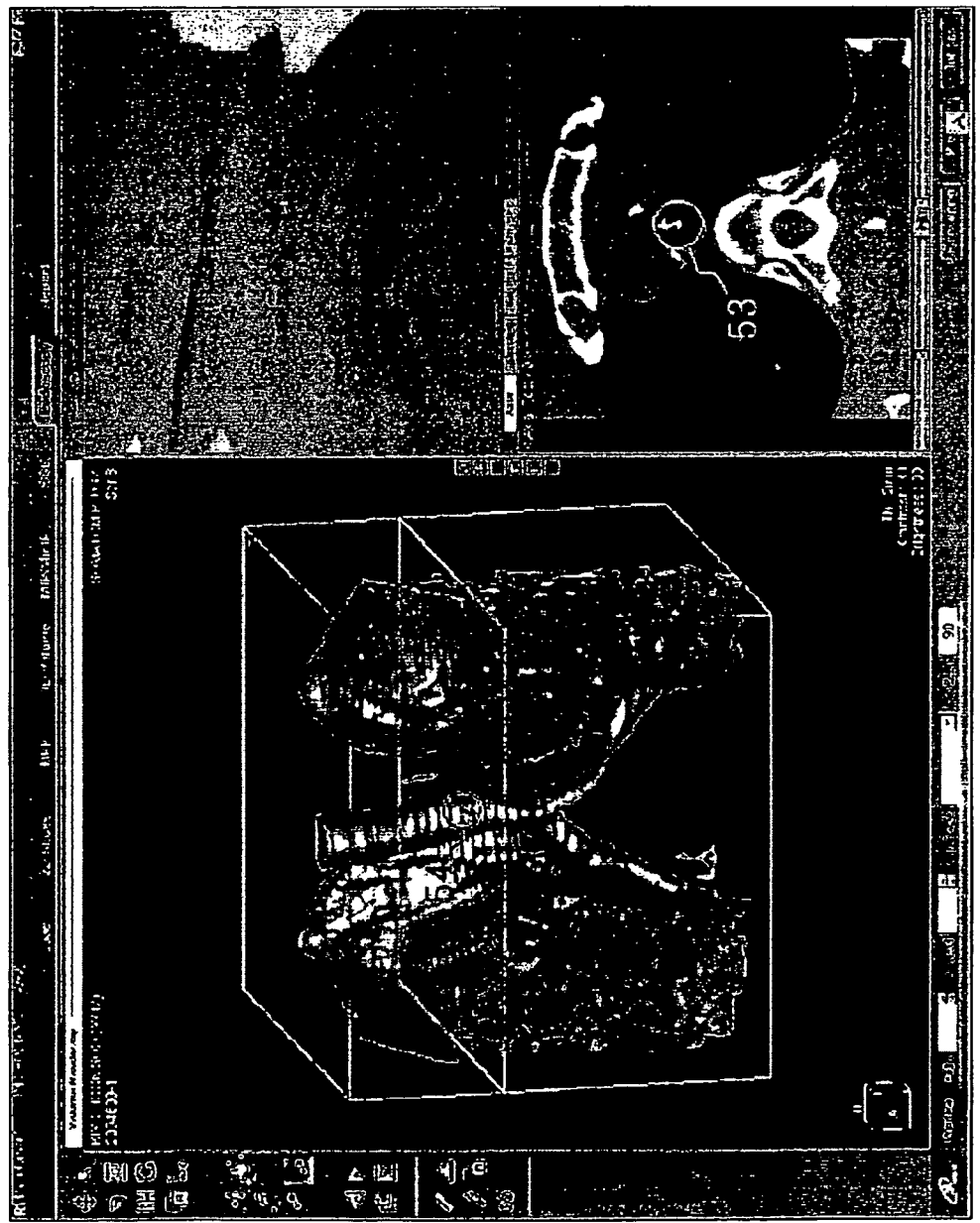

FIG. 4G shows the result of adjusting the direction of the virtual camera 54 on the three-dimensional reference image shown in FIG. 4E. In other words, FIG. 4G shows the result of changing the direction of the virtual camera 54 on the three-dimensional reference image by clicking a point within a camera display circle on the three-dimensional reference image shown in FIG. 4E. Here, the direction of the virtual camera 54 is symmetrically changed with respect to the three-dimensional reference image. Accordingly, if the virtual camera 54 is colored in blue before its direction is changed, it is colored in red after its direction is changed.

The above description just concerns embodiments of the present invention. The present invention is not restricted to the above embodiments, and various modifications can be made thereto within the scope defined by the attached claims. For example, the shape and structure of each member specified in the embodiments can be changed without departing from the spirit of the invention.

INDUSTRIAL APPLICABILITY

As described above, in an apparatus and method for displaying a three-dimensional virtual endoscopic image according to the present invention, a virtual endoscopic image is displayed along with two- and three-dimensional reference images, and these images are associated with one another. Accordingly, correlations among the reference images and the virtual endoscopic image can be effectively presented. In addition, since a virtual camera is intuitively displayed on each of the two- and three-dimensional reference images, and the virtual camera can be operated using a normal user interface such as a mouse, the virtual camera is easily operated.

Therefore, by using the present invention, a virtual endoscopy system can be improved to integrate various images and techniques into a synthetic system.

What is claimed is:

1. An apparatus for displaying a three-dimensional virtual endoscopic image, the apparatus comprising:
   a volume data input unit being configured to input information on a virtual endoscopic image in the form of volume data expressed as a function of three-dimensional position;
   a two-dimensional reference image display control unit being configured to derive a two-dimensional reference image from the volume data and displays the two-dimensional reference image;
   a three-dimensional reference image display control unit being configured to derive a three-dimensional reference image from the volume data using parallel volume rendering and displays the three-dimensional reference image;
   a virtual endoscopic image display control unit being configured to apply position and direction information of a virtual camera used to collect virtual endoscopic image information to a predetermined perspective raycasting algorithm to generate image information, and to display a virtual endoscopic image based on the generated image information, the virtual camera being configured to display a sphere having a predetermined radius from a current position of the virtual camera on the two-dimensional reference image as the camera display sphere and to display a set of intersection points between the camera display sphere and the two-dimensional reference image as the camera display circle, and to display a sphere having a predetermined radius from the current position of the virtual camera on the three-dimensional reference image as the camera display sphere and to display a set of intersection points between the camera display sphere and a plane passing the current position of the virtual camera displayed on the three-dimensional reference image and being parallel with the screen as the camera display circle, and the virtual camera being configured to assume that there is an infinite ray in the direction of each virtual camera, to detect an intersection point between the infinite ray and a corresponding camera display sphere, and to represent the direction of the virtual camera with an arrow starting from the center of the virtual camera and passing the intersection point, and to set a corresponding camera display circle and the virtual camera to have different colors when the virtual camera faces the surface of a hemisphere in front of an image and when the virtual camera faces the surface of a hemisphere in the rear of the imgae;
   a user interface unit being configured to receive a user's operating signal; and
   a controller being configured to control the two- and three-dimensional reference image display control units and the virtual endoscopic image display control unit to be associated with one another based on the operating signal when the operating signal to change image information displayed by one among the two-dimensional reference image display control unit, the three-dimensional reference image display control unit, and the virtual endoscopic image display control unit is input through the user interface unit.

2. The apparatus of claim 1, wherein the two-dimensional reference image display control unit includes
   a control signal input section, which receives a control signal to control a two-dimensional reference image from the operating signal input through the user interface unit,
   an image information receiver, which receives changed three-dimensional reference image information from the three-dimensional reference image display control unit and changed virtual endoscopic image information from the virtual endoscopic image display control unit,
   a painting section, which receives painting information regarding a region of interest in the two-dimensional reference image from the control signal input section and changes two-dimensional reference image information based on the painting information,
   a display area control section, which changes the two-dimensional reference image information based on position change information regarding a region of interest in the two-dimensional reference image, which is received through the control signal input section, or based on position change information regarding a region of interest in the three-dimensional reference image or the virtual endoscopic image, which is received through the image information receiver,
   a camera control section, which changes virtual camera display information with respect to the two-dimensional reference image based on virtual camera display information regarding the two-dimensional reference image, which is received through the control signal input section, or based on virtual camera display information regarding the three-dimensional reference image and the virtual endoscopic image, which is received through the image information receiver,
   a display format determining section, which determines one among an axial image, a coronal image, a sagittal image, and a path MPR image as the format of the two-dimensional reference image, based on display information regarding the two-dimensional reference image, which is received through the control signal input section, a two-dimensional image generator, which receives the changed three-dimensional reference image information and the changed virtual endoscopic image information from the image information receiver and converts the received three-dimensional reference image information and the received virtual endoscopic image information to two-dimensional image information, an image information display section, which detects a changed two-dimensional reference image based on the two-dimensional reference image information received from the painting section, the display area control section, the camera control section, the display format determining section, and the two-dimensional image generator, and displays the changed two-dimensional reference image, and an image information support section, which when the two-dimensional reference image information is changed in the painting section, the display area control section, and the camera control section in response to the control signals received from the control signal input section, transmits the changed two-dimensional reference image information to the three-dimensional reference image display control unit and the virtual endoscopic image display control unit so that the changed two-dimensional reference image information is applied to the three-dimensional reference image and the virtual endoscopic image.

3. The apparatus of claim 1, wherein the three-dimensional reference image display control unit includes a control signal input section, which receives a control signal to control a three-dimensional reference image among the operating signal input through the user interface unit, an image information receiver, which receives changed two-dimensional reference image information from the two-dimensional reference image display control unit and changed virtual endoscopic image information from the virtual endoseopic image display control unit, a painting section, which receives painting information regarding a region of interest in the three-dimensional reference image from the control signal input section and changes three-dimensional reference image information based on the painting information, a display area control section, which changes the three-dimensional reference image information based on position change information regarding a region of interest in the three-dimensional reference image, which is received through the control signal input section, or based on position change information regarding a region of interest in the two-dimensional refererce image or the virtual endoscopic image, which is received through the image information receiver, a camera control section, which changes virtual camera display information with reaped to the three-dimensional reference image based on virtual camera display information regarding the three-dimensional reference image, which is received through the control signal input section, or based on virtual camera display information regarding the two-dimensional reference image and the virtual endoscopic image, which is received through the image information receiver, a three-dimensional volume rendering section, which receives the changed two-dimensional reference image information and the changed virtual endoscopic image information from the image information receiver arid performs three-dimensional volume rendering based on the received two-dimensional reference image and virtual endoscopic image information, an image information display section, which detects a changed three-dimensional reference image based on the three-dimensional reference image information received from the painting section, the display area control section, the camera control section, and the three-dimensional volume rendering section, and displays the changed three-dimensional reference image, and an image information support section, which when the three-dimensional reference image information is changed in the painting section, the display area control section, and the camera control section in response to the control signals received from the control signal input section, transmits the changed three-dimensional reference image information to the two-dimensional reference image display control unit and the virtual endoseopic image display control unit so that the changed three-dimensional reference image information is applied to the two-dimensional reference image and the virtual endoscopic image.

4. The apparatus of claim 1, wherein the virtual endoseopic image display control unit includes a control signal input section, which receives a control signal to control a virtual endoscopic image among the operating signal input through the user interface unit, an image information receiver, which receives changed two-dimensional reference image information from the two-dimensional reference image display control unit and changed three-dimensional reference image information from the three-dimensional reference image display control unit, a painting section, which receives painting information regarding a region of interest in the virtual endoscopic image from the control signal input section and changes virtual endoscopic image information based on the painting information, a perspective ray-casting section, which applies the processing result received from the painting section and the changed two- and three-dimensional reference image information received from the image information receiver to a predetermined perspective ray-casting algorithm to adjust the opacity of the region of interest, and ten changes the virtual endoseopic image information based on the result of the adjustment, a display area control section, which changes the virtual endoscopic image information based on position change information regarding the region of interest in the two-or three-dimensional reference image, which is received through the image information receiver, a camera control section, which changes the virtual endoseopic image information based on position and direction information of a virtual camera, which is received through the control signal input section, a focal zone generator, which designates a region of a user's interest on the virtual endoscopic image based on a control signal transmitted through the control signal input section, an image information display section, which detects a changed virtual endoscopic image based on the virtual endoscopic image information received from the perspective ray-casting section, die display area control section, the camera control section, and the focal zone generator, and displays the changed virtual endoscopic image, and an image information support section, which when the virtual endoscopic image information is changed in the painting section, the perspective ray-casting section, the camera control section, and the focal zone generator in response to the control signals received from the control signal input section, transmits the changed virtual endoscopic image information to the two-dimensional reference image display control unit and the three-dimensional reference image display control unit so that the changed virtual endoscopic image information is applied to the two-dimensional reference image and the three-dimensional reference image.

5. A method of displaying a three-dimensional virtual endoscopic image, the method comprising:

inputting information on a virtual endoscopic image in the form of volume data expressed as a function of three-dimensional position;

detecting a two-dimensional reference image, a three-dimensional reference image, and a virtual endoscopic image from the volume data;

displaying the two-dimensional reference image, the three-dimensional reference image, and the virtual endoscopic image on one screen;

displaying a virtual camera on an area in which the two-dimensional reference image and the three-dimensional reference image are respectively displayed, a camera display sphere and a camera display circle being defined on the basis of a current position of the virtual camera, displaying a sphere, which has a predetermined radius from the current position of the virtual camera on the two-dimensional reference image, as the camera display sphere and displaying a set of intersection points between the camera display sphere and the two-dimensional reference image as the camera display circle, displaying a sphere, which has a predetermined radius from the current position of the virtual camera on the three-dimensional reference image, as the camera display sphere and displaying a set of intersection points between the camera display sphere and a plane, which passes the current position of the virtual camera displayed on the three-dimensional reference image and is parallel with the screen, as the camera display circle, assuming an infinite ray in the direction of each virtual camera, detecting an intersection point between the infinite ray and a corresponding camera display sphere, and representing the direction of the virtual camera with an arrow starting from the center of the virtual camera and passing the intersection point, and setting a corresponding camera display circle and the virtual camera to have different colors when the virtual camera faces the surface of a hemisphere in front of an image and when the virtual camera faces the surface of a hemisphere in the rear of the image; and changing information regarding other image based on information changed by user's operation when information regarding one image among the two-dimensional reference image, the tree-dimensional reference image, and the virtual endoscopic image, which are displayed on one screen, is changed by a user's operation.

6. The method of claim 5, wherein detecting includes detecting the three-dimensional reference image from the volume data by performing parallel volume rendering.

7. The method of claim 5, wherein detecting incluces detecting virtual endoscopic image information by applying position and direction information of each virtual camera to a predetermined perspective ray-casting algorithm.

8. The method of claim 5, wherein the change of the information includes applying changed content to the two-dimensional reference image and then applying the changed content to the virtual endoscopic image using a predetermined perspective ray-casting algorithm and to the three-dimensional reference image using three-dimensional volume rendering when information regarding the two-dimensional reference image is changed by the user's operation, applying changed content to the three-dimensional reference image and then applying the changed content to the virtual endoscopic image using the predetermined perspective ray-casting algorithm and to the two-dimensional reference image using two-dimensional image generation when information regarding to the three-dimensional reference image is changed by the user's operation, and applying changed content to the virtual endoscopic image using the predetermined perspective ray-casting algorithm and then applying the changed content to the two-dimensional reference image using two-dimensional image generation and to the three-dimensional reference image using three-dimensional volume rendering when information regarding to the virtual endoscopic image is changed by the user's operation.

* * * * *